(12) United States Patent
Hammerschmidt

(10) Patent No.: US 7,950,281 B2
(45) Date of Patent: May 31, 2011

(54) SENSOR AND METHOD FOR SENSING LINEAR ACCELERATION AND ANGULAR VELOCITY

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 534 days.

(21) Appl. No.: 11/680,275

(22) Filed: Feb. 28, 2007

(65) Prior Publication Data

US 2008/0202237 A1    Aug. 28, 2008

(51) Int. Cl.
*G01P 9/04*    (2006.01)

(52) U.S. Cl. .................. 73/504.04; 73/504.12

(58) Field of Classification Search ............... 73/504.04, 73/504.12, 504.16
See application file for complete search history.

(56) References Cited

U.S. PATENT DOCUMENTS

| | | | | |
|---|---|---|---|---|
| 4,590,801 | A * | 5/1986 | Merhav | 73/510 |
| 5,379,223 | A * | 1/1995 | Asplund | |
| 5,869,760 | A * | 2/1999 | Geen | 73/504.12 |
| 6,467,349 | B1 * | 10/2002 | Andersson et al. | 73/504.14 |
| 6,636,826 | B1 * | 10/2003 | Abe et al. | |
| 7,461,552 | B2 * | 12/2008 | Acar | 73/504.04 |
| 2004/0088127 | A1 * | 5/2004 | M'Closkey et al. | |
| 2004/0211257 | A1 | 10/2004 | Geen | |
| 2007/0111362 | A1 * | 5/2007 | Westby | 438/50 |

FOREIGN PATENT DOCUMENTS

DE    103 21 962 B4 * 12/2004
EP    1 788 351 A1 * 5/2007

OTHER PUBLICATIONS

Sears and Zemansky, University Physics, Addison Wesley Publishing Co., Inc., Reading, Mass., 1970, p. 153.*

* cited by examiner

*Primary Examiner* — John E Chapman
(74) *Attorney, Agent, or Firm* — Eschweiler & Associates, LLC

(57) ABSTRACT

A sensor has a suspended mechanical resonator being responsive to one of a linear acceleration and an angular velocity of the sensor such that a first area and a second area are subjected to opposite elongation movements and responsive to the other such that the first area and the second area are subjected to a common elongation movement, a first mechanical-electrical interface interacting with the first area, a second mechanical-electrical interface interacting with the second area, a common mode signal generator coupled to the mechanical-electrical interfaces with a common mode signal output, a differential mode signal generator coupled to the mechanical-electrical interfaces with a differential mode signal output, a first processing circuit coupled to the differential mode output, with an output for a first processed signal, and a second processing circuit coupled to the common mode output with an output for a second processed signal.

19 Claims, 11 Drawing Sheets

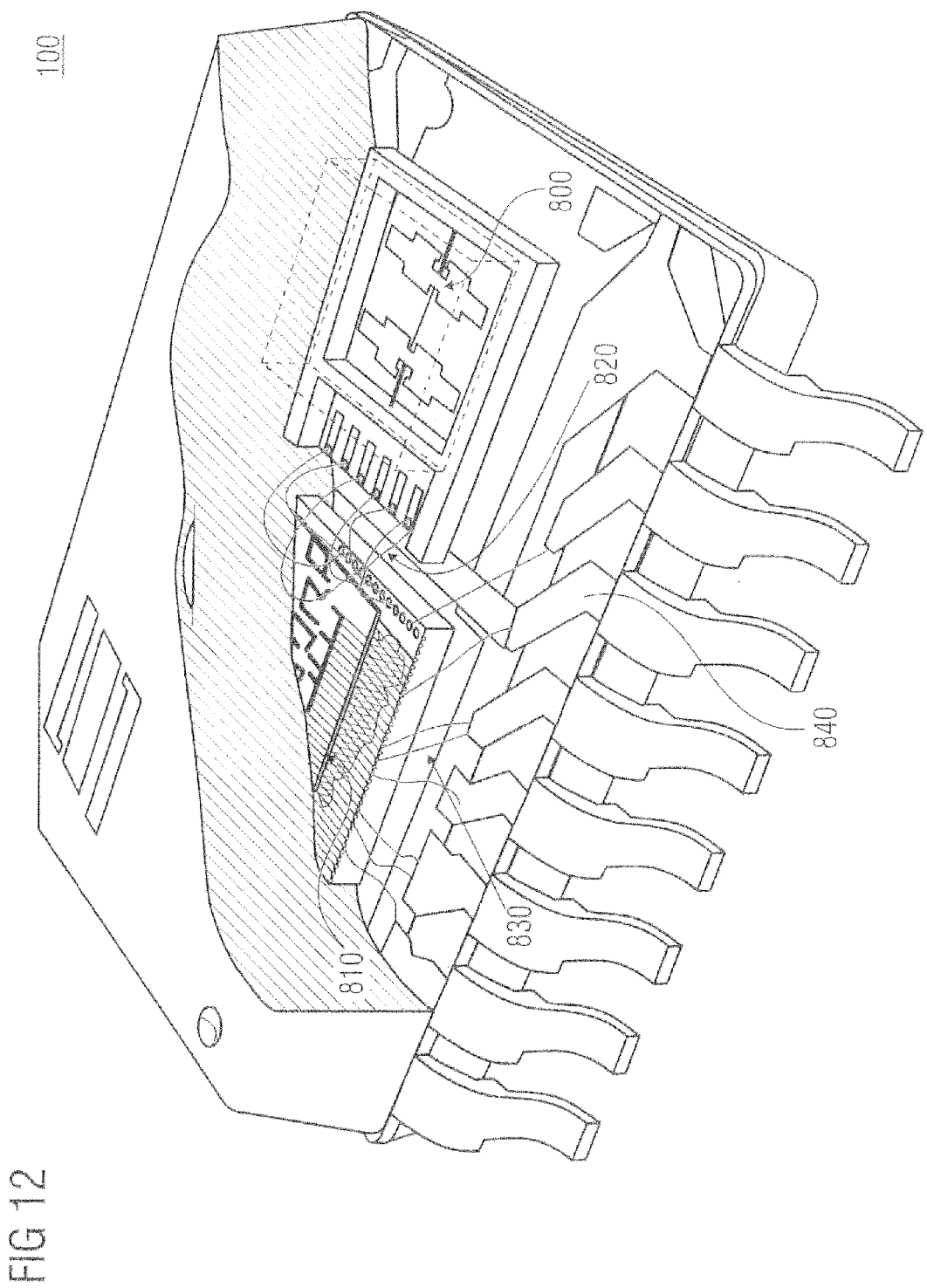

SENSOR AND METHOD FOR SENSING LINEAR ACCELERATION AND ANGULAR VELOCITY

TECHNICAL FIELD

The present invention relates to a sensor and a method for sensing a linear acceleration and an angular velocity, or angular rate which can, for instance, be implemented in systems monitoring the dynamics of vehicles, like cars, trucks, planes, boats and ships.

BACKGROUND

Many vehicles today comprise systems which monitor the motion and the dynamics of the vehicle, for instance in the field of navigational applications (navigational systems) and security related systems. Examples for such vehicles are cars, trucks, ships, boats and planes.

Especially in the fields of street traffic, applications come from the field of security-related applications, for instance from the field of systems improving the active and/or the passive security of cars and trucks. Among the systems improving the active security of cars electronic driving aids, such as anti-blocking systems (ABS) and other dynamic drive control systems employed in modern cars. In the field of systems improving the passive security of cars, systems protecting the security and health of the passengers, e.g. the system for initiating the air bags, belong to the group of systems monitoring the dynamics and motions of the car.

Whenever such a system detects and recognizes a critical driving situation, for instance based on the motion of the car, the respective system is initiated and responds accordingly to fully prevent the critical situation or to minimize the consequences of such a situation (e.g. initiating the air bag in the case of a crash). Other applications comprise the general need to monitor and to detect the driving state of a car for controlling the driving stability (DSC=Dynamic Stability Control) and to control other security systems.

To fully monitor and to detect the motional state and the dynamics of an object both the linear accelerations with respect to three directions in space and the angular velocities or rotational rates with respect to the three directions or axes should be monitored and detected to achieve the full measurement of the motional state of the object.

SUMMARY

According to an embodiment, a sensor may comprise a suspended mechanical resonator capable of oscillating in an excitation mode and may comprise a first area and a second area, the suspended mechanical resonator being responsive to one of a linear acceleration of the sensor and an angular velocity of the sensor such that the first area and the second area are subjected to opposite elongation movements along an elongation direction, and being responsive to the other of the linear acceleration of the sensor and the angular velocity of the sensor such that the first area and the second area are subjected to common elongation movement along the elongation direction. The embodiment of the sensor further comprises a first mechanical-electrical interface interacting with the first area with a terminal, at which a first elongation signal indicative of the elongation of the first area is obtainable, and the second mechanical-electrical interface interacting with the second area with a terminal, at which a second elongation signal indicative of the elongation of the second area is obtainable. Furthermore, a common mode signal generator coupled to the first mechanical-electrical interface and the second mechanical-electrical interface with a common mode signal output for a common mode signal based upon the first and upon the second elongations signals, a differential mode signal generator coupled to the first mechanical-electrical interface and the second mechanical-electrical interface with a differential mode signal output for a differential mode signal based upon the first and the second elongation signal, a first processing circuit coupled to the differential mode output with an output for a first processed signal based upon the differential mode signal indicative of the one of the linear acceleration of the sensor and the angular velocity of the sensor, and the second processing circuit coupled to the common mode output with an output for a second processed signal based upon the common mode signal, indicative of the other of the linear acceleration of the sensor and the angular velocity of the sensor are comprised in the embodiment of the sensor.

BRIEF DESCRIPTION OF THE DRAWINGS

Embodiments of the present invention are described hereinafter, making reference to the appended drawings.

FIG. 12 shows an interior view of a concrete implementation of an embodiment of a sensor.

DETAILED DESCRIPTION

Figure 1:
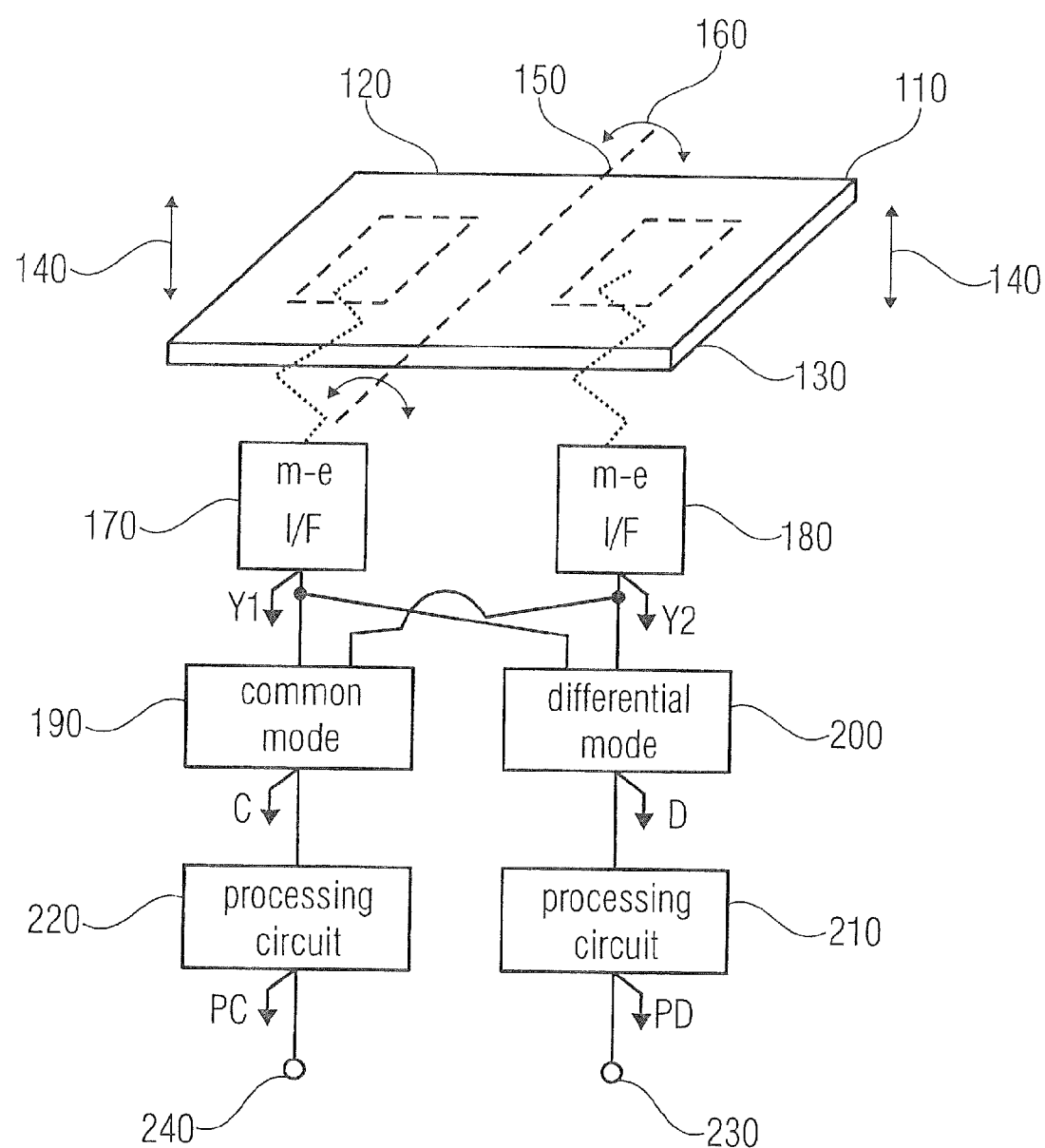
FIG. 1 shows a block diagram of an embodiment of a sensor.

A further embodiment of the sensor may comprise a suspended mechanical resonator capable of oscillating in an excitation mode and may comprise a first area, a second area, a first excitation area and a second excitation area, a suspended mechanical resonator being responsive to an angular velocity of the sensor such that the first area and the second area are subjected to opposite elongation movements along an elongation direction and being responsive to a linear acceleration of the sensors such that the first area and the second area are subjected to common elongation movement along the elongation direction. Moreover, the further embodiment of the sensor comprises a first detection electrode interacting with the first area with a terminal, at which the first elongation signal indicative of the elongation of the first area is obtainable, a second detection electrode interacting with a second area with a terminal, at which a second elongation signal indicative of the elongation of the second area is obtainable, a first excitation electrode interacting with the first excitation area with a terminal for a first excitation signal, a second excitation electrode interacting with a second excitation area with a terminal for a second excitation signal, a common mode signal generator coupled to the first detection electrode and the second detection electrode with a common mode signal output for a common mode signal based upon the first and the second elongation signals, and a differential mode signal generator coupled to the first detection electrode and the second detection electrode with a differential mode signal output for a differential mode signal based upon the first and second elongation signals. Furthermore, the further embodiment of the sensor comprises a first processing circuit coupled to the differential mode output with an output for a first processed signal based upon the differential mode signal indicative of the angular velocity of the sensor, a second processing circuit coupled to the common mode output with an output for a second processed signal based upon the common mode signal indicative of the linear acceleration of the sensor, and an exciter coupled to the first excitation electrode and the second excitation electrode such that the exciter is capable of exciting the suspended mechanical resonator to oscillate in the excitation mode.

According to another embodiment, a sensing means may comprise a means for oscillating in at least an excitation mode comprising a first area and a second area, the means for oscillating being responsive to one of a linear acceleration of the sensing means and an angular velocity of the sensing means such that the first area and the second area are subjected to opposite elongation movements along an elongation direction, and being responsive to the other of the linear acceleration of the sensing means and the angular velocity of the sensing means, such that the first area and the second area are subjected to a common elongation movement along the elongation direction. Furthermore, the embodiment of a sensing means comprises a first mechanical-electrical means for interacting with the first area and for detecting the elongation of the first area, a second mechanical-electrical means for interacting with the second area and for detecting the elongation of the second area, a means for providing a common mode signal based on the elongation of the first area and the elongation of the second area, and a means for providing a differential mode signal based upon the elongation of the first area and the elongation of the second area. Moreover, the embodiment of the sensing means first comprises a means for processing the differential mode signal and for providing a first processed signal based upon the differential mode signal indicative of the one of the linear acceleration of the sensing means, the angular velocity of the sensing means, and a means for processing the common mode signal and for providing a second processed signal based upon the common mode signal indicative of the other of the linear acceleration of the sensing means and the angular velocity of the sensing means.

According to yet another embodiment, a method for sensing a linear acceleration and an angular velocity with a suspended mechanical resonator capable of oscillating in at least an excitation mode comprising a first area and a second area, the suspended mechanical resonator being responsive to one of the linear acceleration of the sensor and the angular velocity of the sensor such that the first area and the second area are subjected to opposite elongation movements along an elongation direction, and being responsive to the other of the linear acceleration of the sensor and the angular velocity of the sensor such that the first area and the second area are subjected to common elongation movement along the elongation direction, may comprise detecting the elongation of the first area, detecting the elongation of the second area, generating a common mode signal based upon the elongation of the first area and the elongation of the second area, generating a differential mode signal based upon the elongation of the first area and the elongation of the second area, processing the differential mode signal to a first processed signal indicative of the one of the linear acceleration of the sensor and the angular velocity of the sensor, and the processing the common mode signal to a second process signal indicative of the other of the linear acceleration of the sensor and the angular velocity of the sensor.

A further embodiment of the method for detecting a linear acceleration and an angular velocity with a suspended mechanical resonator capable of oscillating in at least an excitation mode comprising a first area, a second area, a first excitation area and a second excitation area, the suspended mechanical resonator being responsive to the angular velocity of the sensor such that the first area and the second area are subjected to opposite elongation movements along the elongation direction, being responsive to the linear acceleration of the sensor such that the first area and the second area are subjected to a common elongation movement along the elongation direction, and being responsive to oscillating in the excitation mode upon an interaction with a first excitation area and a second excitation area, may comprise the steps of interacting with the first excitation area and the second excitation area to excite the excitation mode of the suspended mechanical resonator, detecting the elongation of the first area, detecting the elongation of the second area, generating a common mode signal based upon the elongation of the first area and the elongation of the second area, generating a differential mode signal based upon the elongation of the first area and the elongation of the second area, processing the differential mode signal to a first processed signal indicative of the angular velocity of the sensor, and processing the common mode signal to a second processed signal indicative of the linear acceleration of the sensor.

FIG. 1-12 shows block diagrams, perspective views, results of simulations and an interior view of different embodiments of a sensor. Before further embodiments are described with respect to the FIG. 2-12, the first embodiment of a sensor is explained with respect to the schematic representation in the form of a block diagram shown in FIG. 1.

FIG. 1 shows a block diagram of a first embodiment of a sensor 100 capable of detecting a linear acceleration and an angular velocity of the sensor 100. The sensor 100 comprises a suspended mechanical resonator 110, which is suspended in such a way that the mechanical resonators 110 is capable of oscillating in at least an excitation mode. The mechanical resonator 110 comprises a first area 120 and a second area 130, which are subjected to opposite displacement movements along an displacement direction indicated by the arrows 140, if the sensor 100 is subjected to one of the linear acceleration or the angular velocity. For the sake of simplicity, the direction to which the sensor 100 is sensitive with respect to the linear acceleration and the axis to which the sensor 100 is sensitive with respect to the angular velocity are not shown in FIG. 1. It will be appreciated that the term displacement is intended to be synonymous with the term elongation, throughout the specification, to refer to a change in position.

Moreover, the mounting, as well as the springs, beams or spring elements connecting the suspended mechanical resonator 110 with the housing are not shown in FIG. 1. As a consequence of the opposite elongation movements of the first area 120 and the second area 130, the movement of the mechanical resonator 110 comprises an oscillation movement with respect to the axis indicated by the dashed line 150 and the arrows 160.

If the sensor 100 is subjected to the other of the linear acceleration and the angular velocity of the sensor 100, the first area 120 and the second area 130 are subjected to a common elongation movement along the elongation direction indicated by the arrow 140.

The sensor 100 furthermore comprises a first mechanical-electrical interface 170 interacting with the first area 120 and a second mechanical-electrical interface 180 interacting with the second area 130 of the mechanical resonator 110. Both interactions of the first mechanical-electrical interface 170 and the second mechanical-electrical interface 180 are illustrated in FIG. 1 by dotted zig-zag lines. Both, the first mechanical-electrical interface 170 and the second mechanical-electrical interface 180 each comprise a terminal at which the first elongation signal Y1 indicative of the elongation of the first area 120 in the case of the first mechanical-electrical interface 170 and a second elongation signal Y2 indicative of the elongation of the second area 130 in the case of the second mechanical-electrical interface 180 is obtainable.

The embodiment of the sensor 100 furthermore comprises a common mode signal generator 190, which is coupled to both, the first mechanical-electrical interface 170 and the second mechanical-electrical interface 180 to obtain the first and the second elongation signals Y1, Y2 provided by the two mechanical-electrical interface 170, 180. The common mode signal generator 190 is capable of providing a common mode signal C at a common mode signal output based upon the first and the second elongation signals Y1, Y2.

In other words, the common mode signal generator 190 is capable of providing the common mode signal C indicative of a common component of the two elongation signals Y1, Y2. To be even more precise, after an optional pre-processing, filtering, amplifying, modulating, demodulating, or otherwise manipulating the incoming elongational signals Y1, Y2, the common mode signal generator 190 is capable of producing the common mode signal C based on summing the incoming signals or their modified versions. In the context of summing the incoming signals or in a separate post-processing, the common mode signal generator 190 can optionally be also cable of further modifying the result of the summing to provide the common mode signal C. In other words, the common mode signal C is based on the equation $$C = f_1(f_2(Y1) + f_3(Y2)) \quad (1)$$

wherein $f_1$, $f_2$ and $f_3$ are optional integer-valued, rational-valued, real-valued or complex-valued functions representing the optional post-processing before outputting the common mode signal C, the optional pre-processing of the incoming first elongation signal Y1 and the optional pre-processing of the incoming second elongation signal Y2, respectively. It should be noted that in this context the signals and the specific levels of the values of the signals are uniformly identified with their respective reference signs or variables.

The embodiment of the sensor 100 shown in FIG. 1 furthermore comprises a differential mode signal generator 200, which is also coupled to the first and the second mechanical-electrical interfaces 170, 180 to receive the first and the second elongation signals Y1, Y2. Based on the two elongation signals Y1, Y2, the differential mode signal generator 200 is capable of providing a differential mode signal D at a differential mode signal output, which is essentially indicative of the component comprised in the first and the second elongation signals Y1, Y2 having a different sign with respect to the two elongation signals (differential component). Apart from optional pre-processing and/or optional post-processing, the differential mode signal D is essentially based on the difference of the two elongation signals Y1, Y2. To be more precise, the differential signal D is based on the equation $$D = f_4(f_5(Y1) - f_6(Y2)) \quad (2)$$

wherein $f_4$, $f_5$ and $f_6$ are integer-valued, rational-valued, real-valued or complex-valued functions representing the optional post-processing before providing the differential mode signal by the differential mode signal generator 200, the optional pre-processing of the first elongation signal Y1 and the optional pre-processing of the second elongation signal Y2, respectively.

As explained in the context of the common mode signal generator 190, the optional post-processing indicated by the function $f_4$ can also be carried out in the framework of subtracting the two elongation signals Y1, Y2 or (optionally) their pre-processed, modified versions. Moreover, the functions $f_4$, $f_5$ and $f_6$ can correspond to filtering, amplifying, modulating, demodulating or other modifying the respective signals, levels or values of the signals. Examples for such a filtering, demodulation, modulation or other signal processing in the framework of the common mode signal generator 190 and the differential mode signal generator 200 will be explained later on.

Moreover, it should be noted that the functions $f_1, \ldots, f_6$ can in principle depend on further variables, signals, values or signal levels. As an example, each of the functions can optionally depend on one or more additional parameters indicating a mode of operation of the embodiment of the sensor 100. Moreover, the functions $f_1, \ldots, f_6$ can in principle be identical or differ from one another.

The embodiment of the sensor 100 shown in FIG. 1 furthermore comprises a first processing circuit 210 and a second processing circuit 220. The first processing circuit 210 is coupled via an input to the differential mode generator 200 and its differential mode signal output to be able to receive the differential mode signal D provided by the differential mode signal generator 200. The processing circuit 210 comprises an output 230, at which the first processing circuit 210 is capable of providing a processed differential signal PD based on the differential mode signal D and indicative of the one of the linear acceleration and the angular velocity of the sensor 100.

The second processing circuit 220 is connected via an input to the common mode signal output of the common mode signal generator 190 to be able to receive the common mode signal C. The second processing circuit 220 is equipped with an output 240 at which the second processing circuit 220 is capable of providing a processed common mode signal PC based on the common mode signal C and indicative of the other of the linear acceleration and the angular velocity of the sensor 100.

The first and the second mechanical-electrical interfaces 170, 180 are capable of interacting with the first 120 and the second area 130 of the suspended mechanical resonator 110 in a vast variety of methods, depending on the concrete implementation and the concrete requirements of the application in which the embodiment of the sensor 100 is to be implemented. To be more precise, a mechanical-electrical interface can, for instance, interact with the corresponding area of the mechanical resonator 110 by a literal mechanical interaction in the form of an elastic coupling, like an elastic spring, an elastic membrane or an elastic beam. In this case, the mechanical deformation may result in a change of a resistance value, the creation of an electrical voltage or another measurable change of an electrical quantity due to the change of the geometrical shape, a piezoelectrical effect or another mechanical-electrical effect. In such a case, it might be advisable to couple the complete mechanical resonator or the corresponding area or an appropriate structure related to the mechanical-electrical interface into an electrical circuit.

By applying a current or voltage to the mechanical element, it is also possible, depending on the concrete implementation of the mechanical connection between the mechanical-electrical interface and the area of the mechanical resonator 110 to exert a force onto the mechanical resonator.

Moreover, the mechanical-electrical interface can also be implemented by the application of electrical fields interacting between condensator plates located, for instance, underneath the mechanical resonator 110 and interacting with an electrode deposited in the area of the mechanical resonator or interacting directly with the respective area of the mechanical resonator 110 in the case that the mechanical resonator is fabricated from an electrically conducting material. If, for instance, the mechanical resonator is fabricated from a semiconducting material having a sufficiently high electrical conductivity (e.g. silicon, Si), it might be sufficient to provide an electrical contact of the mechanical resonator 110 to be able to measure the change of a capacity value of an electrode of a respective mechanical-electrical interface with respect to the mechanical resonator 110 or of an electrode deposited with respect to the corresponding area on the mechanical resonator 110 in the case that the mechanical resonator 110 is fabricated from an insulating or not sufficiently conducting material (e.g. sapphire). In this case, the elongation signal can be provided by measuring the change of the capacity value of this arrangement. Moreover, by applying a voltage, the mechanical-electrical interface is also capable of exerting a force on the respective area of the mechanical resonator 110 or the mechanical resonator 110 itself. Thereby, an electrostatical or an electrical interaction in the framework of a mechanical-electrical interface offers the opportunity to not only measure the elongation but also to exert a force onto the area of the mechanical resonator or the complete mechanical resonator.

A further alternative is a magnetically interacting mechanical-electrical interface, which can, for instance, comprise a coil, a turn or another arrangement of an electric circuit so that, by applying current to the respective coil or circuit, a sufficiently strong magnetic field is created, which can, for instance, interact with a magnet or a piece of magnetic material deposited onto or underneath the mechanical resonator 110 in the area with which the mechanical-electrical interface interacts. Thereby, the mechanical-electrical interface in the case of a magnetical interaction can exert a force onto the mechanical resonator 110 or the corresponding area. Moreover, the mechanical resonator 110 responds to a linear acceleration or an angular velocity in such a way that, if the corresponding area with the mechanical material deposited moves, an induction voltage can be measured at the coil, turn or other arrangement of an electric circuit of the electrical circuit of the mechanical-electrical interface. Thereby, this induction voltage represents the elongation signal or the corresponding mechanical-electrical interface.

A fourth alternative for such a mechanical-electrical interface is an optically interacting system in which, for instance, a laser diode is integrated into the mechanical-electrical interface to be able to exert a force onto the mechanical resonator 110 by illuminating the corresponding area of the mechanical resonator 110. Moreover, the elongation of the respective area can be measured, in this case, by detecting the intensity of the laser beam reflected at the surface of the area on the mechanical resonator 110. In this case, due to interference effects the intensity measured provides an opportunity to derive the elongation signal.

Moreover, it should be pointed out that the first and the second mechanical-electrical interfaces 170, 180, the common mode signal generator 190, the differential mode signal generator 200 as well as the first processing circuit 210 and the second processing circuit 220 can in principle be analogue or digital circuits or a combination of both. Moreover, parts of the components mentioned before can be implemented as analogue circuits or components, while other parts can be implemented as digital components. Furthermore, it should be pointed out that all or at least some of the components mentioned can in principle be implemented in the form of a processor, optionally accompanied by memory circuits, such that parts of the functionality described above of the sensor 100 or all of the functionalities described above are carried out in the form of software running on a processor or computer.

In this context it should also be noted that circuits, components and other objects being coupled to one another does not only comprise a direct coupling or a direct connection via a wire or another electrically conducting structure, but comprises also the possibility of the respective components and circuits being coupled via further structures, objects, or circuits, like resistors, amplifiers, filters or other circuits.

An embodiment of the sensor 100, as shown in FIG. 1, offers the major advantage of reducing the number of sensor elements in a measuring arrangement capable of detecting the linear acceleration of an object, e.g. a car, with respect to three directions in space and at the same time being capable of measuring the angular velocity or angular rate with respect to three different axes in space, which may or may not coincide with the three directions to which a sensor arrangement of more than one embodiment of a sensor 100 or is sensitive to with respect to the linear acceleration. In other words, an embodiment of the sensor 100 offers the possibility to significantly reduce the number of sensor elements by offering the sensing of both, a linear acceleration and an angular velocity or angular rate with the same suspended mechanical resonator.

A further advantage of the different embodiments is that embodiments of sensors 100 can be manufactured by using the techniques of micro-electro-mechanical systems (MEMS), which offer a very compact and a very energy efficient detection of linear accelerations and angular velocities. In other words, the embodiments offer the possibility to measure or sense at least one linear acceleration with respect to at least one direction in space and at the same time measuring or sensing at least one angular velocity or angular rate with respect to a different or the same direction in space with the same micro-mechanical sensor element in the form of a suspended mechanical resonator.

Before describing further embodiments in more detail, it should be noted that objects, structures and components with the same or similar functional properties are denoted with the same reference signs. Unless explicitly noted otherwise, the description with respect to objects, structures or components with similar or equal functional properties or features can be exchanged with respect to each other. Furthermore, in the following summarizing reference signs, for objects, structures or components, which are identical or similar in one embodiment, or that appear in several embodiments, or in several figures, will be used unless properties or features of a specific object, structure or component is referred to. Using summarizing reference signs thereby enable the more compact and clearer description of the embodiments.

As was already laid out and explained in the context of the embodiment shown in FIG. 1, an embodiment of a sensor 100 offers the opportunity to measure both a linear acceleration of the sensor 100 and an angular rate or velocity of the sensor 100 by having a suspended mechanical resonator 110, which is susceptible to different modes of elongation with respect to a first area 120 and a second area 130 depending on the influence (linear acceleration or angular velocity) inserted on the sensor 100. By measuring or sensing elongations of the first area 120 and the second area 130 via the two mechanical-electrical interfaces 170, 180 a common mode signal C and a differential mode signal D can be extracted from the elongation signals, which can be processed to signals indicative of the respective influence on the sensor 100.

Embodiments of a sensor 100 implemented as micro-mechanical sensors can exploit the influence of the Coriolis forces to detect the angular velocity or angular rate of the sensor. The sensors are very often referred to as micro-mechanical gyroscopes or angular rate sensors and they are capable of measuring an angular velocity. To achieve this, the micro-mechanical resonator 110 is driven into a controlled oscillation, which will be referred to as excitation oscillations or excitation mode.

To create this oscillation in a controlled way, a closed feedback loop to control the amplitude and frequency of the oscillation can be employed. The oscillating structure or the mechanical resonator comprises at least and additional resonance mode, which is proportional to the Coriolis force and, hence, to the angular velocity or angular rate of the sensor 100, as this resonant mode directly or indirectly couples to the excitation mode or an intermediate mode which, in turn, is coupled to the excitation mode. This results in an oscillation in the second or further resonance mode, which will be referred to as detection oscillation or detection mode for the angular velocity, which can be employed for measuring the angular rate. The detection oscillation comprises the same frequency as the excitation oscillation, as the energy of the detection oscillation is provided via the coupling proportional to the angular velocity from the excitation oscillation. Apart from the direct measurement of the detection oscillation, the evaluation of the detection motion of the mechanical resonator can, for instance, be implemented by implementing an additional feedback loop, which is capable of compensating the detection oscillation via a closed force feedback loop.

In this context, it should be noted that the compensation of a detection oscillation does not require the detection oscillation to be completely compensated. In other words, the force feedback implemented to close the force feedback loop compensates the detection oscillation in the sense that, compared to an operation without a closed force feedback loop, the amplitude of the detection oscillation is significantly reduced, typically by 50%, preferably by 90% or more.

Moreover, depending on the concrete implementation of an embodiment of a sensor 100, the excitation mode does not necessarily couple directly to the detection mode but only via an additional, intermediate mode. Depending on the concrete layout, implementation and design of an embodiment of the sensor 100, the excitation mode can couple to the intermediate mode via constructive measures, as will be explained in the context of the mechanical resonator described in FIG. 5-11. In this case, the intermediate mode couples to the detection mode via the angular velocity dependent Coriolis forces. However, in principle, also the excitation mode may couple to intermediate mode via the angular velocity dependent coupling in the form of the Coriolis forces, while the intermediate mode more or less independently from the angular velocity couples to the detection mode via the constructive design of the mechanical resonator.

As indicated earlier, an embodiment of a micro-mechanical (angular rate) sensor often comprises complex structures, which show, apart from the already mentioned oscillation modes, additional resonance modes. In many embodiments, the sensor 100, the excitation mode and the detection mode used for measuring the angular velocity can preferably be chosen and designed to be push-pull oscillations (differential mode) so that these resonate modes are as insensitive as possible with respect to push-push disturbances or common mode disturbances, for instance, caused by linear accelerations acting on the sensor. As a consequence, embodiments of the sensors are not required to be designed such that they do not provide additional oscillation modes.

As a consequence, an embodiment of sensor 100 comprises a mechanical resonator 110, which is designed such that it comprises a sensitivity for a push-pull oscillation mode (differential mode) for an angular rate and a sensitivity for a push-push oscillation mode (common mode) for at least one linear acceleration with respect to at least one direction or vice versa. As will be explained later, the measurement of the angular velocity remains essentially unchanged due to a linear acceleration, which the sensor is subjected to. However, an angular rate can also be detectable by an embodiment of the sensor 100 by being coupled to a common mode oscillation or a push-push oscillation, while a linear acceleration is coupled to a corresponding push-pull oscillation of the mechanical resonator 110.

In principle, the measurement of the linear acceleration can be achieved by evaluating the common mode component of the elongation signals in the case of the linear acceleration corresponding to a push-push or common mode oscillation. Optionally, as previously explained, also in the framework of evaluating the push-push oscillation or the common mode component of the elongation signals, a closed force feedback loop can be employed to measure the common mode component of the elongation signals. This option offers the further advantage that due to implementing the closed force feedback loop the influence of the linear acceleration with respect to the mechanical resonator, or generally speaking, the position of the active sensor element will be controlled, which leads to an improved suppression or compensation of the common mode elongation (push-push oscillation) during the measurement of the differential mode components of the elongation signals for the angular rate.

Figure 2:
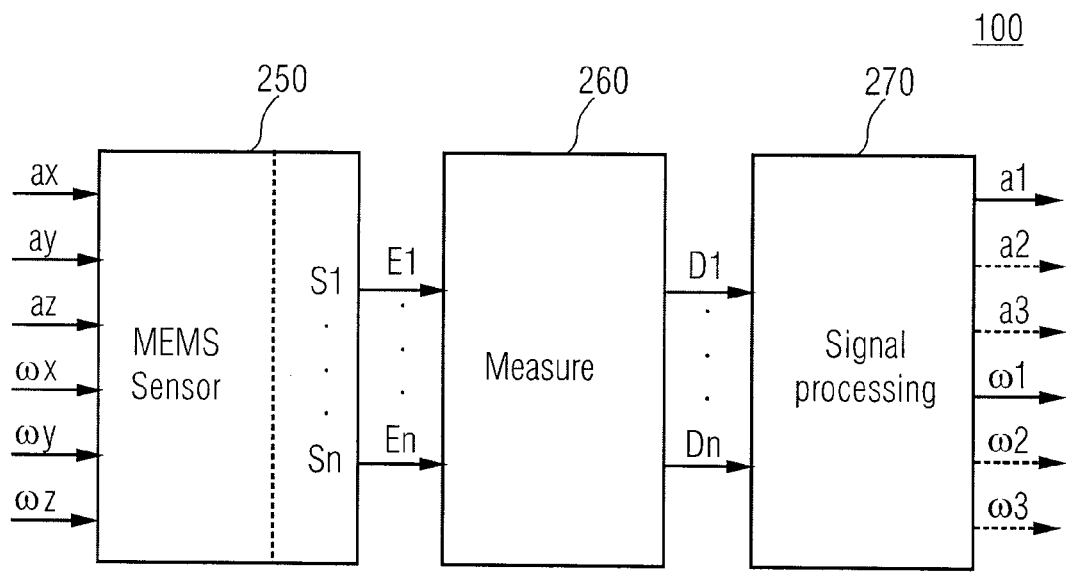
FIG. 2 shows a block diagram of a further embodiment of a sensor.
Figure 3:
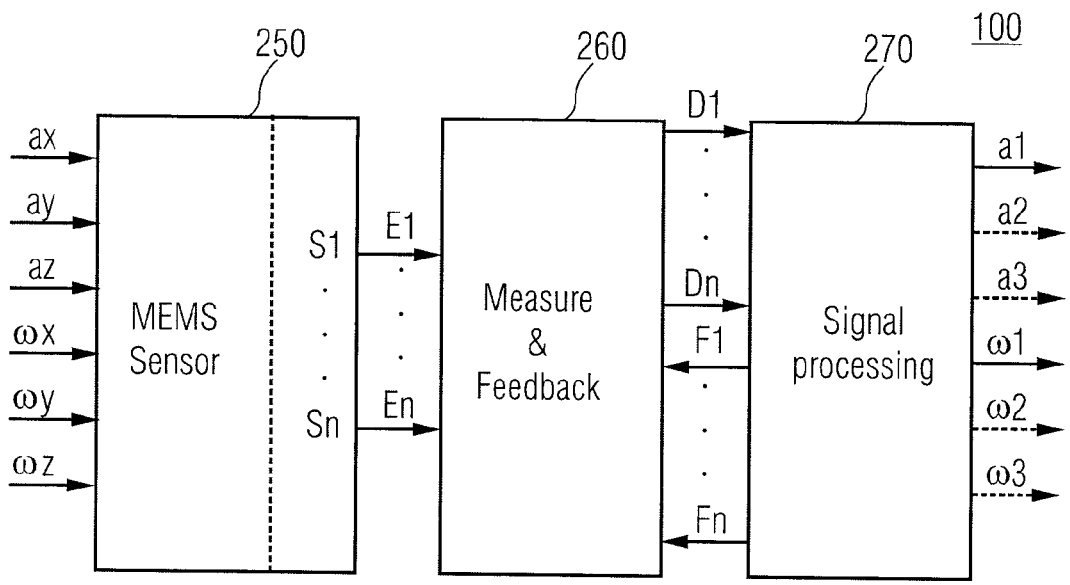
FIG. 3 shows a block diagram of another embodiment of a sensor.

To illustrate the difference between an embodiment of a sensor employing a closed force feedback loop and an embodiment not employing a closed force feedback loop, the differences between the two measuring concepts will be outlined and explained with respect to FIGS. 2 and 3. FIGS. 2 and 3 show embodiments of a sensor 100 in an abstract fashion, wherein the sensor 100 is capable of measuring the linear accelerations with respect to three spatial orientations and is capable of measuring angular velocities also with respect to three different spatial directions or axes. To achieve this, the sensor 100 in FIG. 2 comprises a MEMS sensor block 250 to which a measurement block 260 is coupled. Moreover, the measurement block is coupled to a signal processing block 270.

The environmental quantities to be measured by an embodiment of sensor 100 comprise the linear acceleration and the angular rate acting on (at least one) MEMS structure comprised in the sensor block 250. Each of the two mentioned environmental quantities comprise three spatial components, which are labeled in FIGS. 2 and 3 as ax, ay, az, ωx, ωy and ωz. As indicated in FIG. 2, the sensor block 250 converts the environmental quantities acting upon the sensor 100 into a set of values S1, ..., Sn which are transmitted via an appropriate number of electrical connectors as electrical signals E1, ..., En to the measurement block 260, wherein n is a positive integer. Hence, the sensor block 250 or MEMS structure 250 comprises a number of electrical connectors over which the electrical signals E (E1, ..., En) will be transported to the measurement block 260. In other words, the measurement block 250, which is also labeled in FIG. 2 as MEMS sensor, comprises the mechanical resonator 110 along with the two areas 120, 130 and the mechanical-electrical interfaces 170, 180 introduced and shown in the context of FIG. 1.

The electrical signal provided by the sensor block 250 to the measurement block 260 can comprise voltages, currents, capacity values or resistivity values. It is important to note that the arrows shows in FIGS. 2 and 3 and the other figures of the present application indicating the direction of the signal flow only relate to the direction in which the actual pieces of information are transferred from one component or block to the other. In other words, the arrows with respect to the electrical signals E1, ..., En simply indicate that the signals E will be sensed and measured by the measurement block 260. However, to be able to conduct the aforementioned sensing and measurement, it might be advisable, or even necessary for the measurement block 260 to transmit electrical signals also in the opposite direction.

In other words, it might be advisable or necessary, for the measurement block 260 to supply, for instance, a voltage to the sensor block 250 via the same electrical connections used to measure the current flowing in the direction of the measurement block 260 indicating the concrete piece of information encoded in the respective electrical signal. The measurement block 260 provides the measured quantities in a suitable form to the signal processing block 270. Although a complete analog implementation of an embodiment of a sensor 100 is an option, in the embodiments shown in FIGS. 2 and 3, the measurement block 260 comprises a sample & hold-stage comprising an analog/digital converter so that the pieces of information measured by the measurement block 260 can be provided to the signal processing block 270 as digital signals D1, ..., Dn.

The signal processing block 270 is capable of calculating from the signals providing to the signal processing block 270 as the digital signals D1, ..., Dn at least two of the quantities to be measured comprising at least one linear acceleration and at least one angular rate, to put it in general terms.

The embodiment of sensor 100 shown in FIG. 2 is not required to provide all the output signals a1, a2, a3, ω1, ω2, and ω3 shown in FIG. 2, the signals indicative of the linear accelerations a2 and a3 and indicative of the angular rates ω2 and ω3 represented as dotted lines, f, these are optional signals provided by the signal processing block 270.

The signal processing block 270 can, for instance, calculate the mapping of the digital signals D1, ..., Dn provided to the signal processing block 270 to the signals indicative of the quantities to be measured a1, a2, a3, ω1, ω2, and ω3 based on a set of equations. Typically, the set of equations at least comprises the equations necessary to calculate or to determine the angular rate or the derivative of the angular rate with respect to time based on the differential mode signal, which is comprised in the digital signals D1, ..., Dn.

Furthermore, the set of equations usually also comprises at least the equations necessary to determine and to calculate the linear acceleration from the common mode signal also comprised in the digital signals D1, ..., Dn. However, further equations necessary to calculate further quantities based on the signals provided to the signal processing block 270 can be comprised in the corresponding set of equations. Moreover, in the case that the common mode signal corresponds to an angular rate and the differential mode signal corresponds to a linear acceleration, the aforementioned relations can be exchanged with respect to each other.

In other words, the measurement block 260 comprising the common mode signal generator 190 and the differential mode signal generator 200, whereas the signal processing block 270 comprises the first and the second processing circuits 210, 220 from the embodiment shown in FIG. 1. As will be explained in more detail later, the signal processing block 270 along with the first and the second processing circuits can, for instance, be capable of compensating the influence of other physical influences on the embodiment of the sensor 100. Among those influences to be compensated by the signal processing block 270 is the temperature of the sensor 100, mechanical stress and pressure among other physical influences representing influences capable of distorting the measurement signals.

As previously mentioned, FIG. 3 shows a further embodiment of sensor 100 in a way, which is quite similar to the embodiment shown in FIG. 2. However, the embodiment shown in FIG. 3 is an embodiment comprising a closed force feedback loop as previously outlined. As a consequence, the structure of the embodiment of the sensor 100 shown in FIG. 3 differs slightly from the structure of the embodiment shown in FIG. 2. However, due to the similarities of the two embodiments shown in the FIGS. 2 and 3, reference is made hereby to the description of the embodiment shown in FIG. 2.

Also the embodiment shown in FIG. 3, comprises a sensor block 250 on which the environmental influence comprising the three linear acceleration components ax, ay and az and the three components of the angular rate ωx, ωy and ωz act upon. As previously explained in the context of the embodiment shown in FIG. 2, the sensor block 250 is also capable of providing electrical signals E1, ..., En based on signal values S1, ..., Sn measured by the sensor block 250 (MEMS sensor) to the measurement block 260.

The measurement block 260 in the embodiment shown in FIG. 3 comprises the additional functionality of being capable of providing electrical signal also towards the sensor block 250 so that the mechanical-electrical interfaces comprised in the sensor block 250 are, in turn, capable of interacting with the mechanical resonator 110 to establish the aforementioned closed force feedback loop. Accordingly, also the sensor block 250 differs from the sensor block 250 shown in FIG. 2 with in so far that the mechanical-electrical interfaces are capable of not only providing the elongation signals, but also of exerting a force onto the mechanical resonator as indicated by appropriate feedback signals, (F1, ..., Fn). Accordingly, the measurement block 260 is labeled in FIG. 3 as measure and feedback.

Due to the additional functionality in the form of a closed force feedback loop, also the signal processing block 270 is not only capable of receiving and further processing the digital signals D1, ..., Dn into the measurement signals a1, ω1 and optionally a2, a3, ω2 and ω3 as indicated in the context of the embodiment shown in FIG. 2, but is also capable of producing force feedback signals F1, ..., Fn.

The force feedback signals F1, ..., Fn are provided by the signal processing block 270 to the measurement block 260, in which necessary adaptations and alterations of the signals are carried out before the appropriate electrical signals E1, ..., En are provided back to the sensor block 250. Depending on the concrete implementation, also the force feedback signals F1, ..., Fn can, for instance, be digital signals, which are converted inside the measurement block 260 into analog signals by the appropriate digital/analog-converter. Moreover, it might be necessary to amplify the signals by driver circuits comprised in the measurement block 260 before providing the appropriate signals to the signal lines connecting the sensor block 250 and the measurement block 260.

As a consequence, in this embodiment, the signal flow between the MEMS sensor 250 and the measurement block 260, which is also referred to as an electrical front end, is a bi-directional communication. Compared to the embodiment shown in FIG. 2, the aforementioned bi-directional communication is to be understood in the sense that the signals provided by the electrical front end 260 (e.g. voltages) exerts an intended feedback force onto the sensor 250, which is used to counteract the movements and elongations of the mechanical resonator of the sensor block 250 caused by the angular rate and/or linear acceleration. In other words, the feedback force exerted onto the mechanical resonator is capable of compensating the elongations of the MEMS structure of the sensor 100 caused by the linear acceleration and/or the angular rate. In this case, the measurement block receives, not only the electrical measurement quantities E (E1, . . . , En), but provides electrical signals E adjusted according to the force feedback signals F (i.e. F1, . . . , Fn), which also represents the control signals or actuating signals of the closed feedback loop.

As previously explained, the signals D (i.e. D1, . . . , Dn) are preferably implemented as digital signals. Accordingly, also the force feedback signals F can be implemented as digital signals. Moreover, it should be noted that, in principle also, the electrical signals E can be implemented as digital signals provided that the corresponding analog/digital-converter and the optional digital/analog-converters along with necessary driver circuits are moved from the measurement block 260 into the sensor block 250, which can be implemented in both embodiments shown in FIGS. 2 and 3.

By implementing at least the signals D1, . . . , Dn and F1, . . . , Fn as digital signals, the signal processing block 270 can comprise a set of equations based on which the output signals indicating the measured quantities a1, a2, a3, ω1, ω2, and ω3 can be calculated from the set of equations implemented into the signal processing block 270 based on the signals E1, . . . , En or based on the actuating signals (force feedback signals) F1, . . . , Fn. For instance, the signals indicating the measured quantities are based on at least one common mode signal and at least one differential mode signal, as indicated by the solid lines for the output signals a1 and ω1, compared to the dashed lines for the optional output signals a2, a3, ω2 and ω3.

Figure 4:
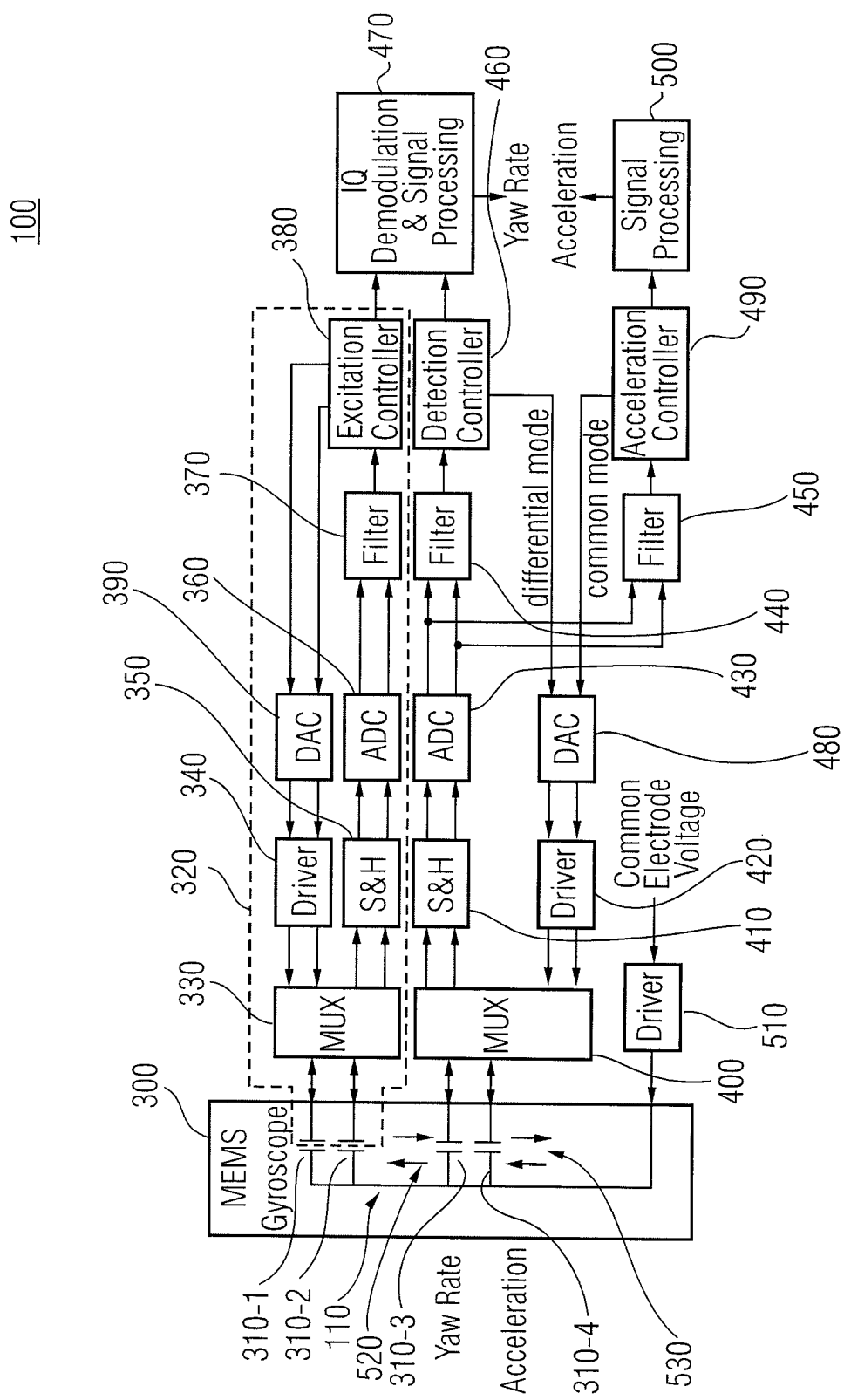
FIG. 4 shows a block diagram of an embodiment of a sensor in the form of a micro-electro-mechanical system.

FIG. 4 shows a further embodiment of a sensor 100. While FIG. 4 is especially dedicated to the electrical signal acquiring and processing, in the framework of the FIG. 5a-11, possible mechanical resonator structures 110 which can be implemented in an embodiment of the sensor 100, will be explained in more detail. It is important to note that the structure of the mechanical resonator 110 is important with respect to the understanding of the embodiments of the sensor 100 and the method for detecting a linear acceleration and an angular velocity as the structure of the mechanical resonator illustrates that the angular velocity (or angular rate) and the linear acceleration will lead to different types of elongations of the respective areas of the mechanical resonator 110.

In the case of an electrostatic/capacitive coupling employed in the mechanical-electrical interfaces, the angular velocity and the linear acceleration will lead to different elongations of the same electrodes, hence leading to different signals with respect to the capacity values of the corresponding electrodes with respect to their respective counter electrodes forming the capacitor. In other words, it is important to note that, in the case of an electrostatic/capacitively operating mechanical-electrical interface, the first and the second area of the mechanical resonator correspond to two different capacitors, the capacity values of which, or the derivatives of which with respect to time, will be determined to measure the angular velocity and the linear acceleration.

Details with respect to parameters used in the framework of embodiments of a sensor 100, which are connected to the mechanical resonator 110 and its particular structure, will be discussed and described in more detail in the context of the description referring to FIG. 5-11.

FIG. 4 shows a block diagram of an embodiment of the sensor 100 in which the emphasis is laid on the electrical circuitry rather than a description of the structure of the mechanical resonator. As a consequence, FIG. 4 shows the mechanical resonator 110 only in terms of its electrical wiring located inside a housing 300 of the MEMS gyroscope. The mechanical resonator 110 comprises a silicon structure which is electrically sufficiently conducting to form the counter electrode of a capacity or a capacitor. To be more precise, the silicon structure of the mechanical resonator 110 forms at least four capacitors with respect to at least four electrodes positioned underneath the mechanical resonator 110. In this configuration, as will be explained in more detail in the context of FIG. 5-11, the areas interacting with the mechanical-electrical interfaces essentially correspond to the areas on the mechanical resonator itself directly opposite of the corresponding electrodes of the mechanical-electrical interfaces.

The embodiment of the sensor 100 in FIG. 4 comprises a total of three closed feedback loops, which are capable of controlling the aforementioned excitation mode as well as capable of compensating the movements of the mechanical resonator 110 due to the influence of the angular velocity and linear acceleration of the sensor 100.

As shown in FIG. 4, the mechanical resonator comprises four capacitors 310-1, 310-2, 310-3 and 310-4, which are referred to as capacitors 310 using summarizing reference signs. From each of the four capacitors 310 one electrode is formed by the silicon structure of the mechanical resonator 110. The other electrodes of the four capacitors 310 are, as explained before, fabricated by depositing counter electrodes on a substrate, which is located underneath the silicon structure of the mechanical resonator 110 and which is sufficiently electrically insulating to avoid short cuts between the electrodes deposited on the substrate.

As will be explained later, the substrate underneath the silicon structure of the mechanical resonator 110 can, for instance be a glass substrate. The counter electrodes of the first and the second capacitors 310-1 and 310-2 are part of the mechanical-electrical interfaces of an exciter 320, or an exciter circuit 320, which is capable of initiating and maintaining the excitation mode of the mechanical resonator 110. Accordingly, the two counter electrodes of the first and the second capacitor 310-1 and 310-2 are coupled to a multiplexer (MUX) 330 which, in turn is coupled to a driver circuit 340 and a sample & hold-stage 350 via two separate signal lines each. As a consequence, the multiplexer 330 is capable of coupling either the counter electrodes of the two capacitors 310-1 and 310-2 to the driver circuit 340 or to the sample & hold-stage 350. The driver circuit 340 can, for instance, be used for an impedance matching and/or a synchronization of the signals. Optionally, the sample & hold-stage 350 may comprise optional low noise amplifier (LNA) so that the electrical signals provided by the two capacitors 310-1 and 310-2 will be amplified before being processed by the sample and hold-stage 350. Preferably, such an optional low noise amplifier will be implemented as an analog component.

The sample & hold-stage 350 is furthermore coupled to an analog/digital converter 360 (ADC) which is dedicated to converting the analog signal provided by the sample & hold-stage 350 into a digital signal. The sampling frequency employed in the analog/digital converter 360 usually lies in the frequency range of several ten kilohertz (kHz) up to several hundred megahertz (MHz), depending on the analog/digital converter employed. For instance, in the case of an analog/digital converter 360 operating as a sigma-delta-modulator, the sampling frequencies are generally in a higher frequency range to insure the required resolution. In other words, in the case of a sigma-delta-modulator the sampling frequency is typically in the range of several hundred kilohertz up to some megahertz (100 kHz<f(sampling)<10 MHz). The analog/digital converter 360 is capable of converting the two signals provided by the sample and hold-stage 350 corresponding to the signals received from the capacitors 310-1, 310-2 separately.

The analog/digital converter 360 is furthermore coupled to the filter element 370 via two signal paths conveying the corresponding digitized signals indicative of the signals retrieved from the two capacitors 310-1, 310-2 and coupled to the exciter 320. Depending on the concrete implementation of the mechanical resonator 110 along with its mechanical properties and the arrangement of the electrodes with respect to the mechanical resonator 110 of the capacitors 310-1, 310-2, the filter 370 provides a filtered signal based upon the signals provided by the analog/digital converter 360 indicative of the excitation mode of the mechanical resonator 110. In other words, the filter element 370 may comprise any combination of individual filter components, for instance, comprising band-pass filters, high-pass filters, low-pass filters, band-rejection filters, and notch filters. Moreover, also more complex filters combining the two signals provided to the filter element 370 may be implemented into the filter 370. As mentioned before, depending on the concrete implementation of the mechanical resonator 110, the filter 370 may, for instance, comprise a band-pass filter along with a filter for calculating a differential mode signal based on an equation similar to equation (2) if, for instance, the excitation mode of the mechanical resonator can be excited via a differential mode signal provided to the two capacitors 310-1, 310-2.

However, the filter element 370 provides a signal to an excitation controller 380 of the exciter 320 indicative of a quantity with respect to the excitation mode of the mechanical resonator 110. An example of such a quantity may, for instance, be the amplitude of the excitation mode. Depending on the signal received from the filter element 370, the excitation controller 380 provides the feedback signals to a digital/analog converter 390 (DAC), which provides the feedback signals as analog signals to the driver 340, which, in turn, amplifies the signals and provides them to the capacitor 310-1, 310-2 via the multiplexer 330, thereby closing the feedback loop.

To summarize, the upper feedback loop creates the excitation oscillation for the measurement of the angular velocity, which is determined by the self resonance of the mechanical resonator 110 of the sensor 100 with respect to the excitation mode. The feedback loop of the exciter 320 is capable of stabilizing the amplitude of the excitation mode and, hence, of the excitation voltage provided to the capacitor 310-1, 310-2.

The exciter feedback loop comprised in the exciter 320 acts upon a first pair of electrodes comprised in the capacitors 310-1, 310-2 on the mechanical structure of the mechanical resonator 110 and generates "electrostatic" forces. As will be explained in the next sections, the feedback quantity will be evaluated via measurements of the capacity values of the two capacitors 310-1, 310-2. Due to the presence of the multiplexer 330, it is possible to switch or multiplex between the determination/measurement and the electrostatic coupling for the force feedback loop, if the measurement principle for the determination of the capacity value requires such a step. This can, for instance, be done based on the time in a time-multiplexed way.

As an example, the measurement of the capacity of the capacitors 310-1, 310-2 can be done by applying a voltage to the capacitors 310-1, 310-2 and by measuring the resulting current, from which information concerning the elongation and/or the derivative of the elongation with respect to time can be gained. In other words, the elongation of the excitation capacitors 310-1, 310-2 can be evaluated by measuring the current, if a voltage or a voltage pattern (e.g. an oscillation) is provided to the excitation capacitors 310-1, 310-2.

However, as the mechanical resonator 110 can, in many cases, be designed such that the excitation capacities 310-1, 310-2 do only require differential signals or differential controlling of the corresponding electrodes, it is in many cases sufficient to evaluate the capacity values of the exciter capacities 310-1, 310-2 differentially. As a consequence, the common mode of the actuating signal or control signal provided by the excitation controller 380 can be freely defined, or can be used to implement, further circuitry-related functions.

In many embodiments of a sensor 100, the exciter 320 provides ac-signals (ac=alternating current) to the mechanical-electrical interfaces with characteristic frequency determined by the different modes of the mechanical resonator 110. For Instance, important frequencies can be the resonant frequencies of the excitation mode, of the different detection modes and/or of the intermediate mode, if present.

Depending on the concrete layout of the mechanical resonator 110, it might be possible that the exciter or the exciter circuit 320 uses an excitation frequency which does not correspond to the frequency of the excitation mode, but to the eigenfrequency or resonance frequency of an intermediate mode, to which the excitation mode is coupled to transfer the energy of the excitation mode into the intermediate mode, which is the actual mode to which the detection mode couples upon an angular velocity or an angular rate due to the Coriolis forces as explained earlier.

As will be explained now, the embodiment of the sensor 100 in FIG. 4 furthermore comprises two additional feedback loops, which are employed in determining the angular velocity (yaw rate) and the linear acceleration. Apart from the two excitation capacitors 310-1, 310-2, the mechanical resonator 110 comprises the two capacitors 310-3 and 310-4, which are also referred to as the detection capacitors. The two detection capacitors or, to be more precise, the electrodes formed on the insulating substrate underneath the silicon structure of the mechanical resonator 310, are coupled to a multiplexer 400 (MUX), which is capable of switching the two signal lines connecting the detection capacitors 310-3, 310-4 to a sample & hold-stage 410 or a driver circuit 420, for instance, based on the time in a time-multiplexed way. As described in the context of the sample & hold-stage 350, the sample & hold-stage 410 may, for instance, comprise a low noise amplifier (LNA) for amplifying the signals retrieved from the detection capacitors 310-3, 310-4. An analog/digital converter 430 (ADC) is coupled to the sample & hold-stage 410 and capable of converting the analog signals provided by the sample & hold-stage 410 into digital signals. Furthermore, the analogue/digital converter 430 may comprise further components and may be constructed in such a way as described in the context of the analog/digital converter 360.

The analog/digital converter 430 is coupled via two outputs to a filter element 440 and a filter element 450 in a parallel configuration. In other words, both filter elements 440, 450 comprise two inputs each, to which the analog/digital converter 430 is coupled to via its two outputs, providing the signals retrieved from the detection capacities 310-3, 310-4 in modified versions. Whereas the filter element 440 is intended to separate a differential mode component from the signals retrieved from the detection capacities, the filter element 450 is capable of separating a common mode component of the two signals mentioned. Accordingly, apart from further filter components, such as the filter components described in context of the filter element 370, the filter element 440 provides a differential mode output, a differential mode signal based on the signals provided to the filter element 440, based on an equation similar to equation (2) as shown above. Accordingly, the filter element 450 provides at a common mode output, a common mode signal based on the signals provided to the filter element 450 based on an equation similar to the equation (1) mentioned above. However, both filter elements 440, 450 can comprise additional filter components such as the filter components mentioned in the context of the filter element 370.

To be more precise, an embodiment of sensor 100 may comprise, as an additional filter component, a band-pass filter with a center frequency at the frequency of the excitation mode or the intermediate mode, depending on the concrete implementation of the mechanical resonator 110, and at the resonance frequency of the detection mode, employed for detecting, for instance, the angular rate. As the detection mode for the angular rate (differential mode) and the excitation mode or intermediate mode (depending on the implementation of the mechanical resonator) comprise the same resonance frequency due to the coupling caused by the Coriolis force, both the filter element 370 and the filter element 440 for the differential mode signal may comprise in some embodiments of sensor 100, a filter component with a band-pass filter characteristic with a center frequency of the resonance frequency of the modes mentioned.

In the case of the filter element 450, for the common mode signal which is, for instance, sensitive with respect to the linear acceleration of the sensor 100, it might be advisable to implement a low-pass filter with a cutoff frequency below the frequency of the excitation mode or the intermediate mode and the detection mode, as the mode indicative of the linear acceleration is in many embodiments not excited in a resonant manner. To be more precise, as the linear acceleration forces act upon the mechanical resonator 110 and in many embodiments no explicit coupling of the respective oscillation mode (also referred to as the linear acceleration mode) is required, the oscillation frequency or eigenfrequency of the linear acceleration mode is not resonantly coupled to the excitation mode or the intermediate mode. Depending on the concrete implementation, if the linear acceleration mode comprises a significant contribution at the resonance frequency of the excitation mode, intermediate mode or detection mode for the angular velocity (e.g. during the final decaying phases of the oscillations) the respective frequencies should be able to pass the filter element 450, so that it might be advisable to implement a band-rejection filter component with rejection frequencies comprising the frequencies of the detection mode for the angular velocity. However, it should be noted that these additional filter components, which may be integrated into the filter elements 370, 440, 450 are optional components and are not required to be implemented.

Moreover, the filter elements 370, 440, 450 may also comprise components for modulating or demodulating the signal based on an internal reference signal or an externally supplied reference signal. An implementation of a modulator or demodulator can, for instance, be employed to reduce or shift the center frequency of the signal output by the filter stages.

The filter stage 440 is connected via a differential mode output to a detection controller 460 which is coupled to a signal processing stage 470, to which the excitation controller 380 is also coupled. The signal processing stage 470 may, in turn, comprise a demodulator and further signal processing capabilities, as discussed and explained in the context of the embodiments shown in FIG. 2-3, which may comprise the functionality of compensating the temperature influence, pressure influence and other environmental influences. As a consequence, the signal processing stage 470 is labeled as "IQ demodulation & signal processing" in FIG. 4. (IQ=in-phase and quadrature-phase) To be more precise, the demodulation of the signal is carried out with respect to the eigenfrequency of the excitation mode, or the intermediate mode, depending on the implementation of the mechanical resonator 110, which is equal to the resonance frequency of the detection mode for the angular velocity. As a consequence, the signal processing stage 470 is capable of providing an output signal indicative of the angular velocity or yaw rate.

The detection controller 460 is, however, also coupled to a digital/analog converter 480, to which a differential mode feedback signal is provided by the detection controller 460, which also takes over the functionality of a differential mode feedback controller. The filter element 450 for the common mode signal is coupled to an acceleration controller, which, in turn, is coupled to a signal processing stage 500, which is capable of providing an output signal indicative of the acceleration the embodiment of the sensor 100 is subjected to. In this context, the signal processing stage 500 can be constructed, such that it is also possible to compensate for the aforementioned environmental influences.

Furthermore, the acceleration controller 490 provides a common mode feedback signal to the digital/analog converter 480, to which the acceleration controller 490 is also coupled to. As a consequence, the acceleration controller 490 also comprises the functionality of a common mode feedback controller.

The aforementioned digital/analog converter 480 is not only capable of converting the digital input signals into analog signals, but is also capable of generating individual feedback signals based upon the differential mode feedback signal and the common mode feedback signal provided by the acceleration controller 490 and the detection controller 460. In other words, the digital/analogue converter 480 is not only capable of converting the signals, but also capable of at least basic algorithmic manipulations based on the equations $$FB1 = \tfrac{1}{2} \cdot (CMFB + DMFB) \quad (3)$$

and $$FB2 = \tfrac{1}{2} \cdot (CMFB - DMFB), \quad (4)$$

wherein FB1 and FB2 are the first and the second feedback signals or the values of the first and the second feedback signals, CMFB is the value of the common mode feedback signals and DMFB is the value of the differential mode feedback signal. However, additional offsets, factors or more complex functions can be implemented in the case of a concrete implementation of a digital/analog converter 480.

Moreover, it should be noted that, although the calculation based upon the calculations (3) and (4) might be carried out more easily as digital signals, also an analog implementation of the equations (3) and (4) can be implemented.

Closing the feedback loop for the differential mode detection and the common mode detection, the digital/analog converter 480 is coupled to the driver circuit 420 which, for instance, can adjust the signal levels and/or amplify the signals provided by the digital/analog converter. Moreover, the driver circuit 420 may comprise circuits for impedance matching and/or circuits for synchronizing the signals provided by the detection controller 460 and the acceleration controller 490 via the digital/analog converter 480. Hence, the driver circuit 420 and the driver circuit 340 may, in principle, offer the same functionality.

The embodiment of the sensor 100 furthermore comprises a common driver circuit 510, to which a common electrode voltage can be supplied. The common driver circuit 510 is coupled to the mechanical resonator 110 and provides an optionally stabilized or amplified common electron voltage to the mechanical resonator 110, such that the conducting silicon structure of the mechanical resonator 110 is set a well defined potential, with respect to the areas or electrodes of the two exciter capacitor 310-1, 310-2 and the two detection capacitors 310-3, 310-4.

The common electrode formed by the silicon structure of the mechanical resonator itself can be provided by the common driver circuit 510 with a fixed potential, but also a more complex signal pattern. More complex signals patterns (e.g. an oscillation with a predefined frequency) can be, for instance, employed in the field of the measurement of the capacity values of the capacitors 310. Furthermore, via the common driver circuit 510 and the silicon structure of the mechanical resonator 110, a common mode electrostatic force can be exerted on the mechanical resonator 110, which can, for instance, be employed to adjust the resonance frequency of the detection oscillation, with respect to the excitation frequency of the excitation oscillation, or with respect to the frequency of the intermediate oscillation, depending on the concrete implementation and lay out of the mechanical resonator 110. Generally, by applying a common electrode voltage via the common driver circuit 510 to the silicon structure of the mechanical resonator 110, the resonance frequencies of the oscillation modes, comprising a movement perpendicular to the plane of the mechanical resonator 110, can be altered by applying a mechanical bias tension, produced by the mechanical resonator itself, due to the forces exerted onto the mechanical resonator the capacitors 310. As a consequence, by increasing the common electrode voltage, the forces exerted by the mechanical resonator 110 on itself will be increased, which may, for instance, lead to an increased resonance frequency of the oscillations involved.

Typically, the resonance frequencies can be adjusted in the range of +/−50%. However, by limiting the common electrode voltage to a range of several volts (e.g. 1-2 V), the manufacturing tolerances of the mechanical resonator 110, which are typically in the range of around +/−10% up to +/−20% with respect to the resonance frequencies of the excitation mode and the detection mode for the angular velocity, can be compensated. Moreover, it should be noted that, by applying a bias force, due to the design of the mechanical resonator 110, also by applying a common electrode voltage via the common driver circuit 510, the resonance frequencies of the oscillation modes involved can be reduced. However, more details will be discussed in the context of FIG. 6-11.

Hence, via the common drive circuit 510, the excitation mode and/or the detection mode are alterable modes as characteristic features of these modes can be altered by applying a common mode drive voltage.

Upon turning, the embodiment of the sensor 100, due to the excitation oscillation or due to the intermediate oscillation, which is coupled to the excitation oscillation (if present due to the design of the mechanical resonator 110), the detection oscillation, which is proportional to the angular velocity or angular rate, will be created. Hence, an oscillation of the mechanical resonator 110 (sensor element) in a further oscillation mode, will be created with the frequency of the excitation. This oscillation will be compensated by the detection feedback loop, by applying electrostatic forces, which exert counteracting forces onto the mechanical resonator 110, so that the oscillation is counteracted. Apart from the detection capacitors 310-3, 310-4, the multiplexer 400, the driver circuit 420 and the digital/analog converter 480, the corresponding detection feedback loop comprises a sample & hold-stage 410, the analog/digital converter 430, the filter element 440 and the detection controller 460. The actuating signal provided by the detection controller 460 can hence be used to derive a measure for the angular rate. As a consequence, in the case of an implementation of a feedback loop, as shown in FIG. 4, the actuating signal can be provided to the signal processing stage 470, to provide a basis for the yaw rate or angular rate signal, as the output signal of the signal processing stage 470.

It should be noted, that, as indicated in FIG. 4 by the two opposing arrows 520, an angular velocity, angular rate or yaw rate will create a differential signal with respect to the two detection capacitors 310-3, 310-4 in the case of the capacity value measurement. Accordingly, as indicated by the parallel arrows 530 in FIG. 4, a linear acceleration will create a common mode signal in the framework of a capacity value measurement.

In the embodiment shown in FIG. 4, with respect to the detection feedback loop for both, the differential mode signal indicative of the yaw rate, and the common mode signal indicative of the linear acceleration, the switching or multiplexing between the force feedback mode and a capacity value measurement phase can be realized by the multiplexer 400, as it was described in the context of the excitation feedback loop of the exciter 320, if, in the context of the measurement and evaluation of the change of the capacity values of the detection capacitors 310-3, 310-4 requires this, e.g. in a time-multiplexed way.

As previously outlined, the mechanical resonator 110 or the micro mechanical structure of the mechanical resonator 110 can furthermore be excited or driven into a further oscillation or motion mode, which has no significant meaning and influence on the angular velocity determination and measurement. Further modes can, for instance, be excited by a linear acceleration of the sensor 100. In contrast to the detection motion employed at determining the angular rate, the capacity values of the detection capacitors 310-3, 310-4 will not be changed in opposite directions, but in a common direction. Hence, the dynamics of this mode can be sensed by detecting the common mode component of the change of the capacity values of the detection capacitors 310-3, 310-4. Moreover, this mode can also be compensated by a common mode component of the force feedback voltage applied to the detection capacitors 310-3, 310-4 during the force feedback phase. Hence, the actuating signal of the acceleration controller 490 can not only be used to compensate the motion of the mechanical resonator 110 in this case, but can also be used as a measure for the linear acceleration.

Hence, an embodiment of the sensor 100 offers the opportunity for a combined measurement of a yaw rate, angular rate or angular velocity and a (linear) acceleration with the same sensor element or mechanical resonator 110. In other words, an embodiment of the sensor 100 is capable of outputting signals indicative of angular rate and a (linear) acceleration based on a single MEMS structure as a mechanical resonator. An embodiment of such a sensor 100 can, for instance, be employed in the field of gyroscopes and acceleration sensors, for instance, to be applied in the field of ESP-related applications (ESP=electronic stability programs) for cars.

An embodiment of the sensor 100 shown in FIG. 4 offers the possibility to determine the angular rate from the differential mode signal provided by the two detection capacitors 310-3, 310-4 by employing the detection feedback circuit, comprising the multiplexer 400, the sample & hold-stage 410, the analog/digital converter 430, the sensor element 440, 450, the detection controller 460, the acceleration controller 490, the digital/analog converter 480 and the driver circuit 420. The output signal indicative of the linear acceleration, however, is derived from the common mode component of the same electrode path of the detection capacitor 310-3, 310-4. As a consequence, both quantities can be extracted at the same time from the same measured signals by separating the differential mode component and the common mode component of the two detection capacitors 310-3, 310-4. Furthermore, due to the separation of a common mode component and the differential mode component, it is possible to use both quantities to establish a closed force feedback loop by combining the differential mode component and the common mode component of the two resulting feedback signals. In other words, both measurement quantities can be fed back to establish, in principle, two closed force feedback loops. Moreover, by employing the multiplexer 400. it is possible to use the same electrodes of the same capacitors 310-3, 310-4 for measuring the corresponding signals to be processed to the output signals and, at the same time, for supplying the feedback signals to compensate for elongations caused by the movement of the sensor 100.

However, it should also be noted, that the common mode feedback loop for compensating the mode excited by the (linear) acceleration will influence the resonance frequency of the detection mode employed to measure the angular rate. This influence is comparable to an adjustment of the resonance frequency of the detection mode for the angular rate by applying a common electrode voltage to the common electrode formed by the silicon structure of the mechanical resonator 100, as described before. However, this does not constitute a disadvantage compared to an embodiment of a sensor 100 without a closed force feedback loop for the common mode, as the elongation of the common mode oscillation, which is not compensated by a closed force feedback loop, will slightly influence the resonance frequency of the mechanical resonator 110 and its different modes. To be more precise, the influence caused by the closed force feedback for the common mode component is comparable to a non-compensated movement, which can be understood by considering a plate capacitor having a distance d and with a voltage U applied to. In this case, the electrical fields E is given by the voltage applied U divided by the distance d of the two electrodes of the plate capacitor, $$E=U/d. \quad (5)$$

Without a closed force feedback, a common mode change of the distance d of the plate of the capacitor, with respect to a constant voltage U, will result in a comparable change of the electrical field E according to equation (5), as in the controlled case. In the controlled case, a common mode change of the distance of the capacitor plates d is kept constant while the voltage U across the capacitor will be changed.

It should be noted that an embodiment of the sensor 100 can also be constructed differently, especially with respect to the mechanical resonator 110, which will be described in more detail. Alternatively, the detection of the linear acceleration can, in principle, be achieved via a differential mode of the corresponding oscillation. Accordingly, the angular rate can be detected via a common mode of the mechanical resonator 110. As previously mentioned, this depends on the concrete form of the oscillation modes of the mechanical structure or mechanical resonator 110 and on the configuration of the electrodes.

Moreover, it should be noted that the sample & hold-stage 350, 410 as well as the analog/digital converters 360, 430 and the digital/analogue converters 390, 480 are optional components, which are not required to be implemented. In the case, of all optional components using the filter stages 440, 450 correspond to the signal generators 190, 200 shown in FIG. 1. In this case, furthermore, the filter stages 440, 450 may comprise additional filter components comprising low-pass filter characteristic, high-pass filter characteristic, band-pass filter characteristic, band-rejection filter characteristics or notch filter characteristics. Moreover, additional demodulator components and/or modulator components can be optionally integrated into the filter stages 440, 450. Naturally, in this case, they can be implemented as analogue components. Compared to a digital implementation, as shown in the framework of the embodiment of the sensor 100 in FIG. 4, this might represent an additional challenge, as it might be advisable to enable an adjustment of the characteristic frequencies of the analog filter components (e.g. threshold frequencies, center frequencies, etc.) in accordance with the resonance frequencies, as the resonance frequencies and the characteristic frequencies of the analog components might undergo variations caused by manufacturing tolerances with respect to the mechanics and the electronics involved.

Typically, an embodiment of the sensor 100 comprises a mechanical resonator 110, capable of oscillation modes, sensitive to at least one angular rate, with respect to one direction and sensitive to at least one linear acceleration, with respect to at least one spatial direction. Furthermore, the mechanical resonator 110 can be implemented as a MEMS structure (MEMS=micro-electro-mechanical system), comprising different oscillation modes. Among these oscillation modes is at least one common mode and one differential mode, which are sensitive to the angular rate and the linear acceleration, respectively.

To summarize, the excitation loop comprised in the exciter 320 is responsible for setting up the constant amplitude movement for the excitation mode or via the excitation mode for the intermediate mode. Critical issues controlled are start-up time, noise and mode selectivity. The detection loop is responsible for recovering the angular rate signal proportional to the Coriolis force. This is achieved by the embodiment shown in FIG. 4 by using a force feedback closed loop operation.

The time multiplexed, switched interface comprising the two multiplexers 330, 400 in between the gyro element or mechanical resonator 110 and the rest of the embodiment of the sensor 100, make it possible to improve the symmetry using the same electrodes for the drive phase (force feedback phase) and the sense phase (measurement phase). A switch demodulator, which can, for instance, be comprised in the sample & hold-stage 410, is used to demodulate the measured AM signal (AM 0 Amplitude Modulation). The demodulating signal is then A/D-converted by the analog/digital converter 430.

The advantage of employing linear demodulation is good selectivity or relaxed filter requirements and a neglectable noise folding.

In other words, fine-tuning of a detection vibration mode for the angular velocity and optionally for the detection mode for the linear acceleration is done during final tests for each sensor by applying and programming a DC bias via the common driver circuit 420, utilizing the non-linearity of the electrostatic force to reduce the mechanical stiffness.

At the final stages of a fabrication process of an embodiment of a sensor 100, calibration coefficients can be determined during final tests for each sensor, which can then be stored, for instance, in OTPROM polyfuse cells (OTPROM=One-time programmable read-only memory). Fixed algorithms, for instance, implemented into the signal processing stages 470, 500 are used for accurate angular rate definition and linear acceleration definition, as well as for temperature compensation using these coefficients and readings from the internal temperature sensor (not shown in FIG. 4). Moreover, as the signal path for both the angular rate and the linear acceleration signals comprise (digital) high pass as well as low pass filters, which can for instance be comprised in the filter stages 440, 450, the measurement quality can be significantly enhanced. Furthermore, the signal processing stages 470, 500 can furthermore implement a self test of the embodiment of the sensor 100 by, for instance, modifying the excitation with respect to amplitude, frequency or phase, and by detecting the measured outcome with the predictable effects such modifications should impose on the performance of the sensor 100.

FIGS. 5a and 5b show a first example of a mechanical resonator 110. The mechanical resonator 110 comprises two oscillating plates 600-1, 600-2, which are interconnected by an asymmetric beam 610. The two oscillating plates 600-1, 600-2 are mechanically, elastically connected to a mounting 620 via two mechanically elastical springs 630-1, 630-2.

As explained earlier, the mechanical resonator 110 can, for instance, be fabricated from a silicon wafer or membrane, being positioned over an essentially insulating substrate, with an electrode arrangement deposited thereon. In the schematic drawings shown in FIGS. 5a and 5b, the substrate underneath the mechanical resonator 110 is not explicitly shown. However, FIGS. 5a and 5b show the electrode arrangement in a plane underneath the mechanical resonator 110, wherein the upward direction is defined as the positive z-direction, as illustrated by a coordinate system 640 depicted underneath FIG. 5b.

To be more precise, the electrode structure on the insulating substrate comprises four detection electrodes 650-1, 650-2, 650-3 and 650-4 as well as four stimulation electrodes or excitation electrodes 660-1, 660-2, 660-3 and 660-4. Due to the symmetric layer of the mechanical resonator 110 comprising the two separate oscillating plates 600-1, 600-2, each of the four capacitors 310 shown in FIG. 4 is comprised of one electrode underneath the first oscillating plate 600-1 and a corresponding electrode underneath the second oscillating plate 600-2. As an example, the excitation electrodes 660-2 and 660-3 corresponding to the two oscillating plates 600-1, 600-2, respectively, represent the electrode on the substrate of the first capacitor 310-1. Accordingly, the excitation electrode 660-1 and 660-4 represent the bottom electrodes of the second capacitor 310-2. In other words, the electrodes 660 represent the bottom electrodes of the exciter capacitors 310-1, 310-2.

Accordingly, the electrodes or detection electrodes 650-1 and 650-4 are corresponding to the first oscillating plate 600-1 and the second oscillating plate 600-2, respectively, represent the bottom electrodes of the detection capacitor 310-3, as an example. Moreover, the detection electrode 650-2 and 650-3 represent the bottom electrodes of the second detection capacitor or fourth capacitor 310-4.

By applying an oscillating voltage signal as an exciting signal to the exciter capacitors 310-1, 310-2, due to the described configuration of the exciter electrode 660, the mechanical resonator 110 starts to oscillate in the form of a vertical bending such that the asymmetric beam 610 begins to oscillate in the z-direction. Due to the fact that the asymmetrical beam 610 comprises an asymmetric cross section, which will be explained in more detail in the context of FIG. 8, an excitation of this excitation mode results in the slight sideways component of the movement. As a consequence, the two oscillating plates 600-1, 600-2 start to show an oscillation with respect to each other in the plane of the oscillating plates 600-1, 600,2 in opposite directions.

In other words, due to the asymmetry of the cross-section of the asymmetric beam 610, the asymmetric beam 610 causes a movement along the y-direction. This in-plane movement is coupled to the excitation mode previously described and represents the intermediate mode to which the Coriolis forces can couple to create the detection oscillation to be sensed by the detection electrodes 650. However, to limit the amplitude of the excitation mode with respect to the intermediate mode, it might be advisable to design the mechanical resonator 110 such that the resonance frequencies of the excitation mode and the intermediate mode differ from one another. If the frequency of the excitation signal provided to the excitation electrodes 660 matches approximately the resonance frequency of the intermediate mode, the excitation mode will only exhibit a small amplitude compared to the ever building amplitude of the intermediate mode, until an equilibrium is reached. The equilibrium is defined by the damping of the mechanical resonator 110 and other damping losses compared to the energy supplied to the mechanical resonator.

In other words, if the excitation mode is excited with the resonance frequency of the intermediate mode, the energy of this smooth movement will be accumulated in the desired intermediate mode to which the Coriolis forces couple to stimulate the detection mode for the angular rate. Furthermore, the amplitude of the intermediate mode increases with every stimulation.

In other words the oscillating plates 600-1, 600-2 will rotate with respect to each other as coupled plates with respect to their center point wherein the oscillation of the two separate oscillating plates 600-1, 600-2 exhibits an opposite direction.

Due to the described intermediate mode, essentially representing an oscillation in the plane of the oscillating plates 600-1, 600-2, the detection mode for the angular rate will be excited by Coriolis forces, when the mechanical resonator 110 is turned about an axis perpendicular to the asymmetric beam 610 in the plane of the oscillating plates 600-1, 600-2. The corresponding oscillation is indicated by the arrow 670-1, 670-2 in FIG. 5a. The oscillating plate 600-1 and the oscillation plate 600-2 will, however, oscillate in opposite directions with respect to each other so that the resulting detection mode is with respect to the detection electrode 650 an asymmetric or differential mode. In yet other words, the oscillation indicated by the arrows 670-1, 670-2 is caused by an angular rate coupling so that the oscillating plates 600-1, 600-2, begin to oscillate about an axis 675 interconnecting the springs 630-1, 630-2 and the asymmetric beam 610.

FIG. 5b shows the same arrangement of the mechanical resonator 110, which differs from the drawing shown in FIG. 5a by the fact that the oscillating plate 600-1, 600-2 have been excited by a linear acceleration in the z-direction to exhibit a detection mode for the linear acceleration in which the outer portions of the two oscillating plates 600-1, 600-2 are bent synchronously upwards and downwards as indicated by the arrows 680 in FIG. 5b As a consequence, both oscillating plates 600-1, 600-2 exhibit a common mode of oscillation with respect to the detection electrodes 650.

In other words, the oscillating plates 600-1, 600-2 would start a bending movement due to a z-acceleration movement of the sensor 100.

Figure 5:
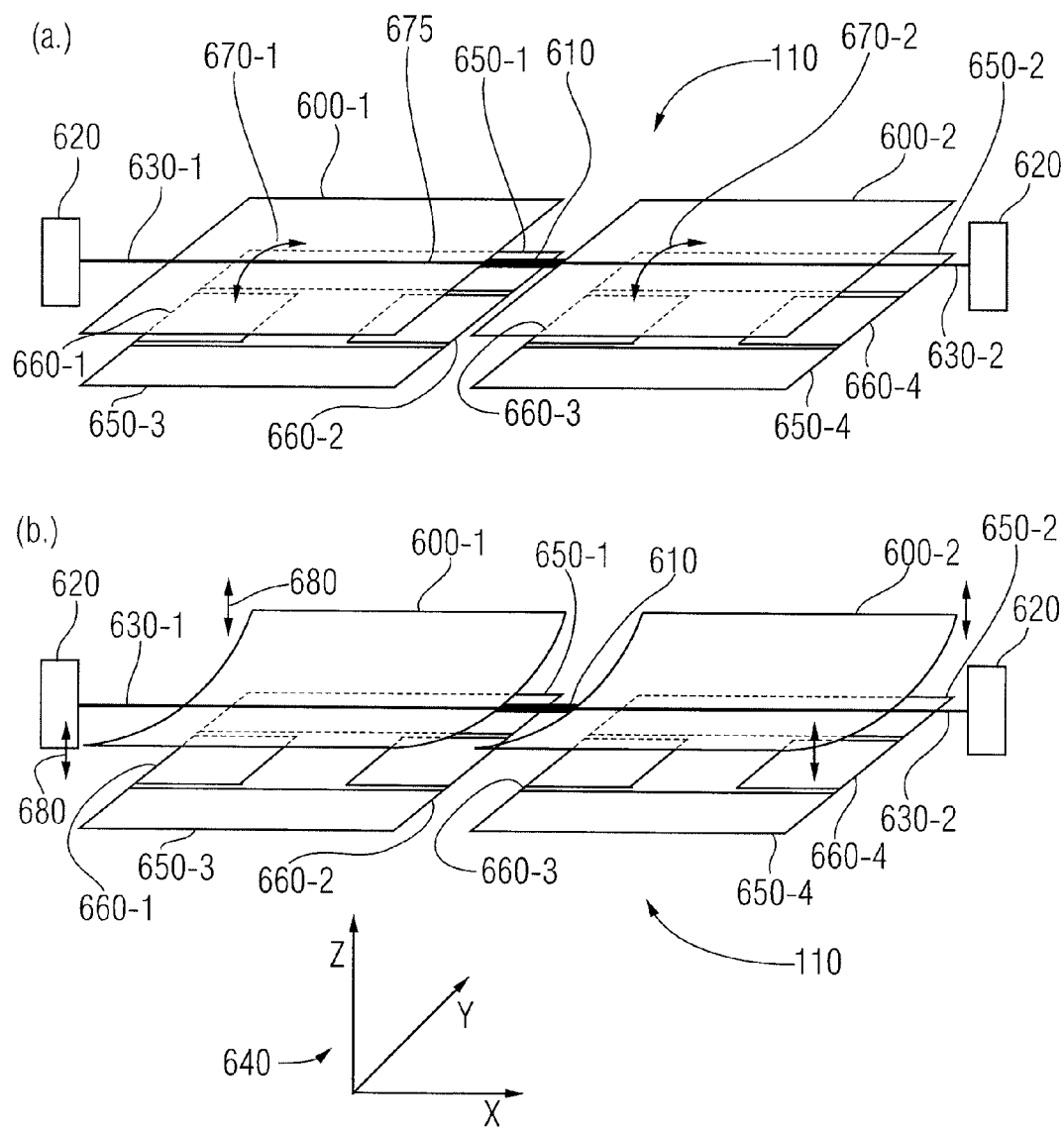
FIGS. 5a and 5b show a schematic representation of a mechanical resonator of an embodiment of a sensor.
Figure 6:
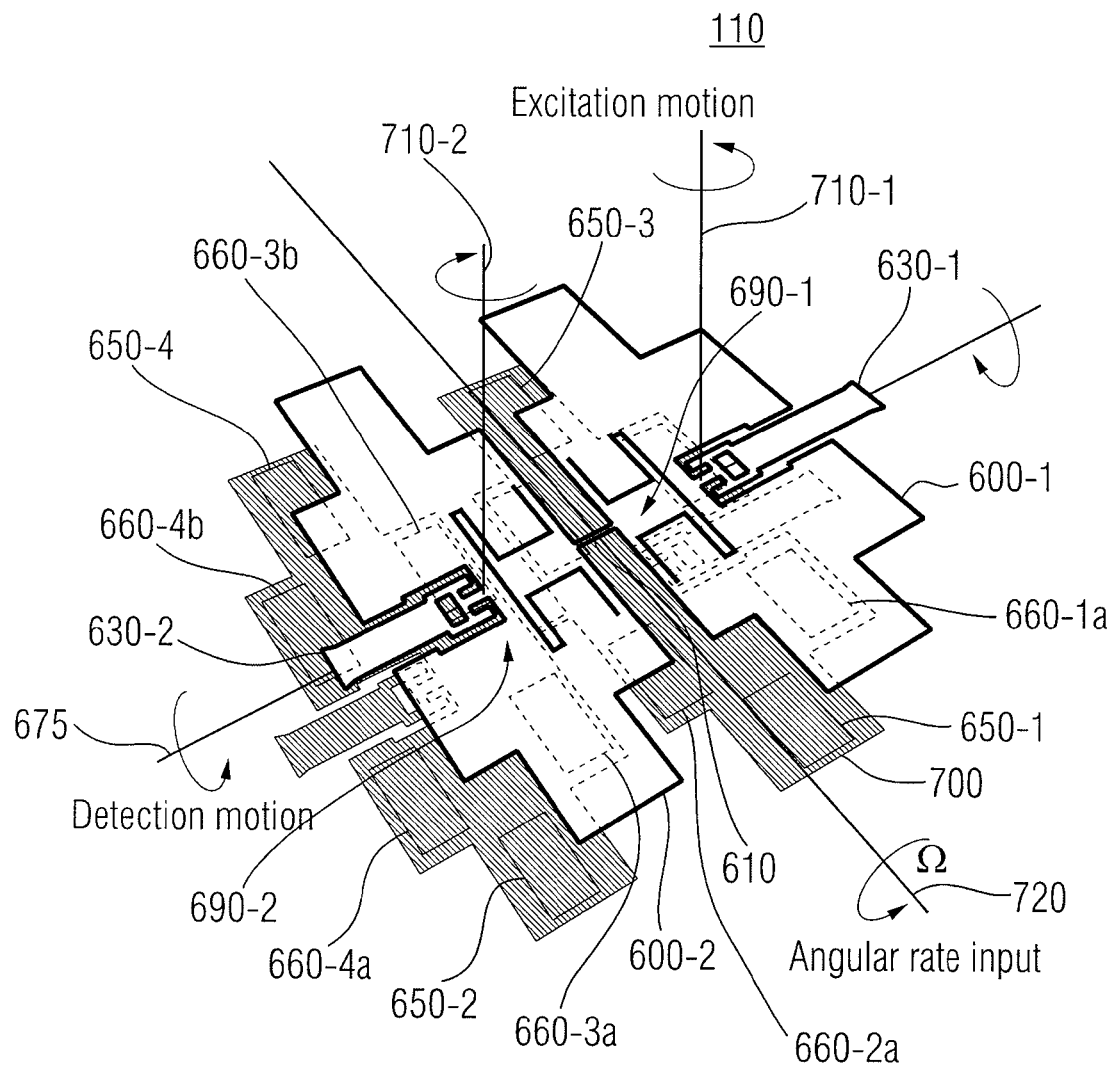
FIG. 6 shows a perspective view of a mechanical resonator comprising butterfly masses.

FIG. 6 shows a perspective view of a mechanical resonator 110 of a further embodiment of a sensor 100. To be more precise, the mechanical resonator 110 shown in FIG. 6 differs from the mechanical resonator 110 shown in FIG. 5 with respect of the shape of the oscillating plates 600-1, 600-2, with respect to the springs 630-1, 630-2 and with respect to the arrangement of the electrodes in the plane below the plane of the mechanical resonator 110 itself. Furthermore, the mechanical resonator 110 shown in FIG. 6 shows additional spring elements 690-1, 690-2 in the center area of the mechanical resonator comprising the asymmetric beam 610. However, with respect to design and features, the mechanical resonator 110 does not significantly differ from the mechanical resonator 110 shown in FIG. 5.

To illustrate the position of the electrodes in the plane below the plane of the oscillating plates 600-1, 600-2 a shadow 700 of the mechanical resonator 110 is shown in FIG. 6. Due to the special design of the springs 630-1, 630-2 and the additional spring element 690-1, 690-2, which will be explained in more detail later, the excitation electrodes 660-1 to 660-4 of the mechanical resonator 110 shown in FIG. 5, are symmetrically distributed with respect to the axis 675. To be more precise, for instance, the excitation electrode 660-4 situated in the vicinity of the second spring 630-2 of the second oscillating plate 600-2 is substituted in the embodiment shown in FIG. 6 by two electrodes 660-4a and 660-4b which are electrically coupled in parallel to the respective multiplexer, so that the two excitation electrodes 660-4a and 660-4b together form the excitation electrode 660-4. Accordingly, all the other excitation electrodes 660-1 to 660-3 of the mechanical resonator 110 shown in FIG. 5 are also split up into two subelectrodes, which are coupled in parallel.

The mechanical resonator shown in FIG. 6 is a MEMS mechanical resonator of a fabricated from a single crystal silicon substrate. The structure is built up by using a bottom glass chip or substrate with metalized pattern defining excitation electrodes 660 and detection electrodes 650, as well as bonding pads, a middle micromachine silicon chip with the masses which also represent the opposite electrode and a top cover glass chip. The three chips are bonded together using anodic bonding and the low parasitic electrical crossing into the cavity are established by using buried conductor techniques. The double masses or oscillating plates 600-1, 600-2 are suspended using an asymmetric beam with an asymmetric cross-section, which will be discussed in more detail in the context of FIG. 8.

Before the functional principle with respect to the different modes involved in the case the mechanical resonator 110 will be explained in more detail, the spring elements 690-1, 690-2 will be considered first. As previously mentioned, the mechanical resonator 110 is comprised of a micromachined butterfly shape double mask mechanical resonator. The micromachined silicon wafer with the resonator masses or oscillating plates 600-1, 600-2 and their connecting beams, the springs 630-1, 630-2 and the asymmetric beam 610, is bonded between two glass wafers in a hermetically sealed cavity. The spring 630-1, 630-2 connects the oscillating plate 600-1, 600-2 with respect to the mounting 620 (not shown in FIG. 6).

The electrodes 650, 660 for electrostatic stimulation of the mechanical resonator 110 and the capacitive readout are located on the bottom wafer. The electrodes 650 and 660 are electrically connected via buried bulk electrical feedthroughs. Press contacts between the glass of the insulating substrate and silicon of the mechanical resonator 110 to allow for the buried feedthrough contacts, the electrodes are defined by a metallization step on the glass substrate.

However, even if the glass substrate comprises a well-matched temperature coefficient used for the top and bottom chips, there will always be a small temperature dependence stress in the structure of the mechanical resonator. The plastic package and the soldering to the circuit board can also cause stress with respect to the mechanical resonator. As the three beams, the springs 630-1, 630-2 and the asymmetric beam 610 are placed in a straight line along the axis 675, the structure has some sensitivity to compressive forces, which can create a mismatch in frequency. To avoid or at least to minimize the impact of such compressive forces, the spring elements 690-1, 690-2 are placed as stress relief springs on both sides of the center beam or asymmetric beam 610. These stress relief springs 690-1, 690-2 are weak in the direction of the beams and absorbs the stress in this direction. In other directions, the stress relief springs 690-1, 690-2, are stiffer and do not influence the oscillation modes or the function of the sensor.

The functional principle is also indicated in FIG. 6. It is based on the electrostatic excitation of a reference motion or intermediate mode, which enables a conservation of momentum. This excitation motion is related to a lateral banding of the beams connecting both the masses 601-1, 601-2. As indicated in FIG. 6 an out-of-phase oscillation of the two masses 601-1, 601-2 is caused with respect to the two axes 710-1, 710-2.

An angular rotation (angular rate input) around an axis 720, perpendicular to the asymmetric beam 610 in the plane of the mechanical resonator 110 will generate Coriolis forces, whose frequency equals that of the reference motion or intermediate mode. As a consequence, an angular rotation of the device comprising the reference motion will create inertial forces due to the law of conservation of momentum (Coriolis forces). These forces cause a result in detection motion for the angular rate, which is proportional to the angular rate of the device. The detection motion is, as explained earlier, an out-of-phase oscillation with respect to the axis 675. Both, the excitation and detection motion are out-of-phase, which makes them insensitive to external vibrations, improves the Q-factor and limits effects, which cause offsets.

Figure 7:
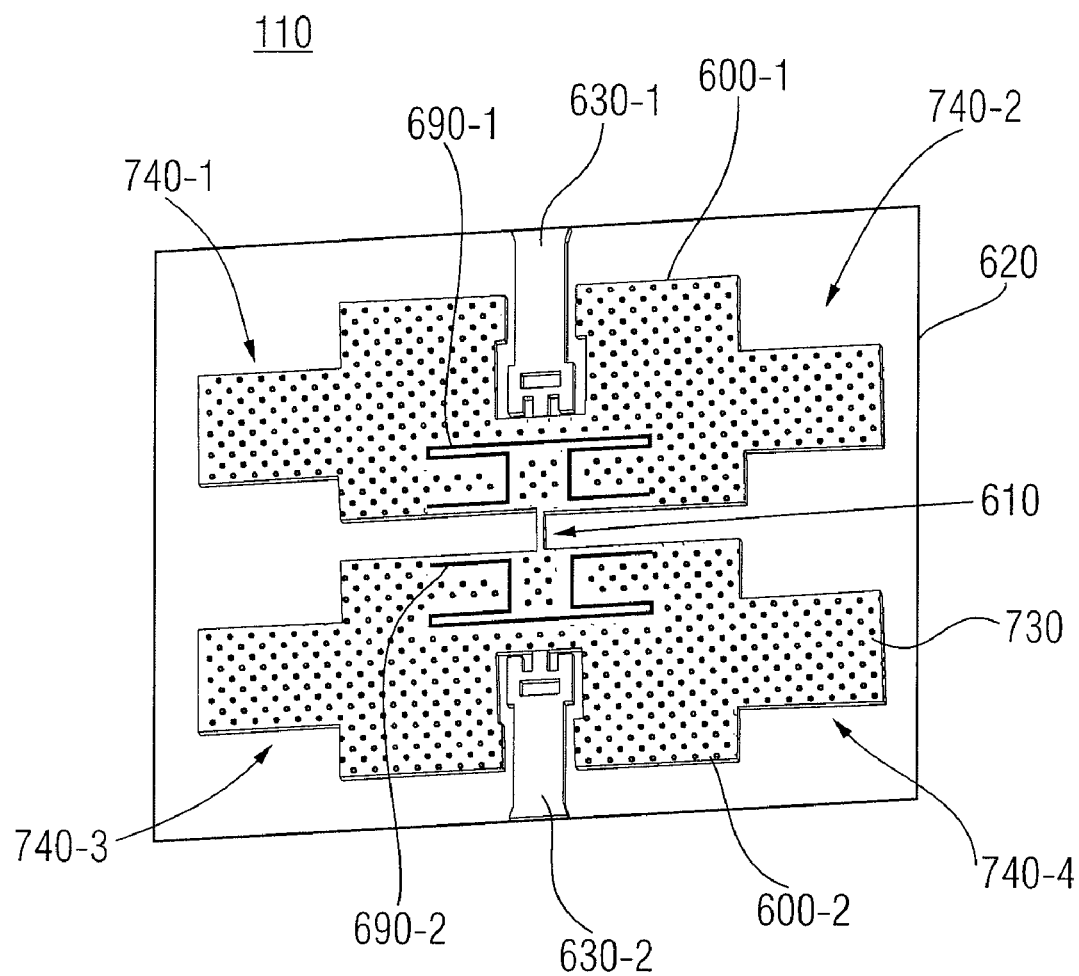
FIG. 7 shows a scanning electron micrograph of the mechanical resonator in the form of the butterfly masses.

FIG. 7 shows a schematic representation of a SEM image (SEM=scanning electron microscope) of the "butterfly masses" 600-1, 600-2 of the mechanical resonator 110. As can be seen from FIG. 7, the springs 630-1, 630-2 are coupled to the housing 620 . Moreover, FIG. 7 shows that a concrete implementation of the mechanical resonator 110 can comprise additional structures. As an example, the SAR 10 mechanical resonator shown in FIG. 7 comprises additional holes 730 with a regular distribution. By implementing such a hole structure, the mass of the mechanical resonator as well as its elastic properties can be altered. However, the electrode arrangement is not shown in FIG. 7.

To further simplify the forthcoming discussion with regard to the modes, reference is made to the four wing-like shaped outer structures 740-1, 740-2, 740-3 and 740-4, which will also be referred to as "wings". These wings 740 distinguish the structure of a mechanical resonator shown in FIGS. 6 and 7, apart from the additional spring element 690-1, 690-2 and the different springs 630-1, 630-2, from the more simplified structure of the mechanical resonator 110 shown in FIG. 5.

Figure 8:
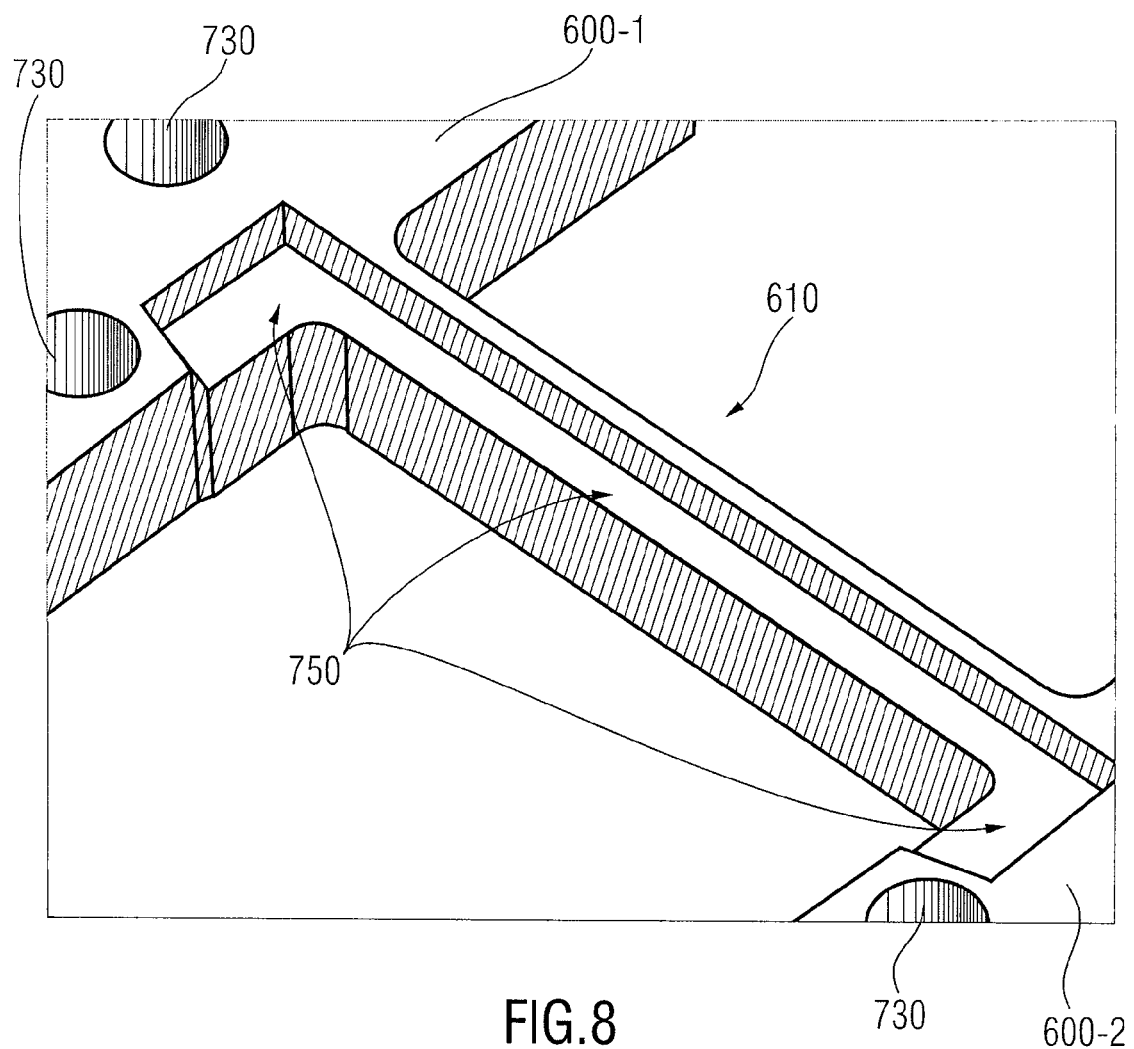
FIG. 8 shows a scanning electron micrograph of a asymmetric beam connecting the two butterfly masses of the mechanical resonator of an embodiment of a sensor.

FIG. 8 shows a schematic representation of a SEM image of an asymmetric beam 610 (SEM=Scanning Electronic Microscope). The double masses 600-1, 600-2 are suspended using the asymmetric beam 610, which comprises an asymmetric cross-section, so that transversal (normal to the chip) electrostatic forces created by the excitation electrodes not shown in FIG. 8 bend the beam 610 both transversally and laterally (in the plane of the chip). This creates a rotational excitation oscillation, in which typically 10% of the movement is vertical and 90% is horizontal. However, the concrete figures with respect to the distribution of horizontal and vertical movement may depend of further parameters such as the frequency of the excitation and so on.

The asymmetry is achieved by one corner of the asymmetric beam 610 having a recess edge 750, which can be seen in the SEM image in FIG. 8. The vibrating masses are shaped so that the velocity vectors are essentially lateral, which gives transversal Coriolis forces, and therefore, transversal detection oscillations, which are capacitively detected. In this way, the simplicity and maturity of bulk micromachining is combined by the benefit of high gyroscopic sensitivity. Furthermore, FIG. 8 shows three holes 730, which have already been shown in SEM image in FIG. 7.

The asymmetric structure of the asymmetric bean 610 causes a slight sideways movement component, when the asymmetric beam 610 is moved vertically with respect to the plane of the micromechanic resonator 110. Hence, due to the structure of the asymmetric bean 610, kinetic energy is transferred from the vertical movement of the mechanical resonator 110 into a horizontal motion, with respect to the plane of the mechanical resonator 110.

Figure 9:
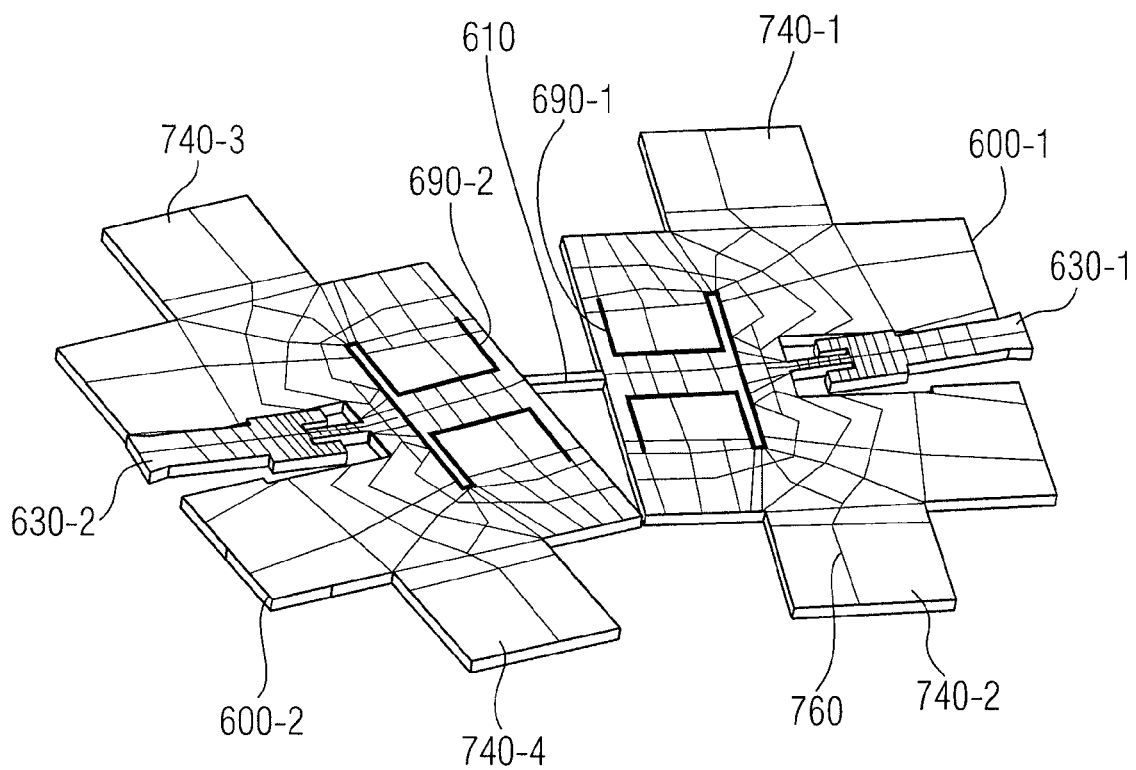
FIG. 9 shows a result of a simulation of a reference motion (second mode) of the mechanical resonator shown in FIG. 6-8.

FIG. 9 shows a result of a computer simulation of the reference motion or intermediate mode of the mechanical resonator 110. This mode, which is indirectly excited by the exciter electrodes, is also called the second mode and merely comprises a horizontal banding of the beams 630-1,630-2, 610 which makes the masses oscillate out-of-phase about a normal vertical axis. Typically, the frequency of this intermediate mode is of the order of 10 kHz or to be more precise, in the range between 1 kHz and 20 kHz. However, the simulation shown in FIG. 9 is based on a resonance frequency of 9 kHz. It should be noted that the second mode or intermediate mode shown in FIG. 9 cannot be altered with respect to its resonance frequency to a very good approximation, because the oscillation motion mainly takes place in the plane of the mechanical resonator 110. As a consequence, applying an offset voltage via the common driver circuit 510 to the mechanical resonator 110 does not significantly change the elastic properties of the mechanical resonator with respect to movements in its plane. Hence, the resonance frequency of this mode is to a good approximation independent of a DC bias voltage applied to the silicon structure of the mechanical resonator.

FIG. 9 furthermore shows a set of contour lines 760 which are the result of an numerical simulation of the mechanical resonator 110. The contour lines 760 comprise information concerning the elongation of the mechanical resonator 110.

As explained earlier, the second mode shown in FIG. 9 cannot be directly excited by the exciter electrodes underneath the mechanical resonator 110. As a consequence, the intermediate mode is stimulated via the excitation mode and the asymmetric beam 610. As the second mode shown in FIG. 9 is mainly limited to the plane of the mechanical resonator, this mode cannot be stimulated by the electrodes underneath the mechanical resonator or the chip.

Figure 10:
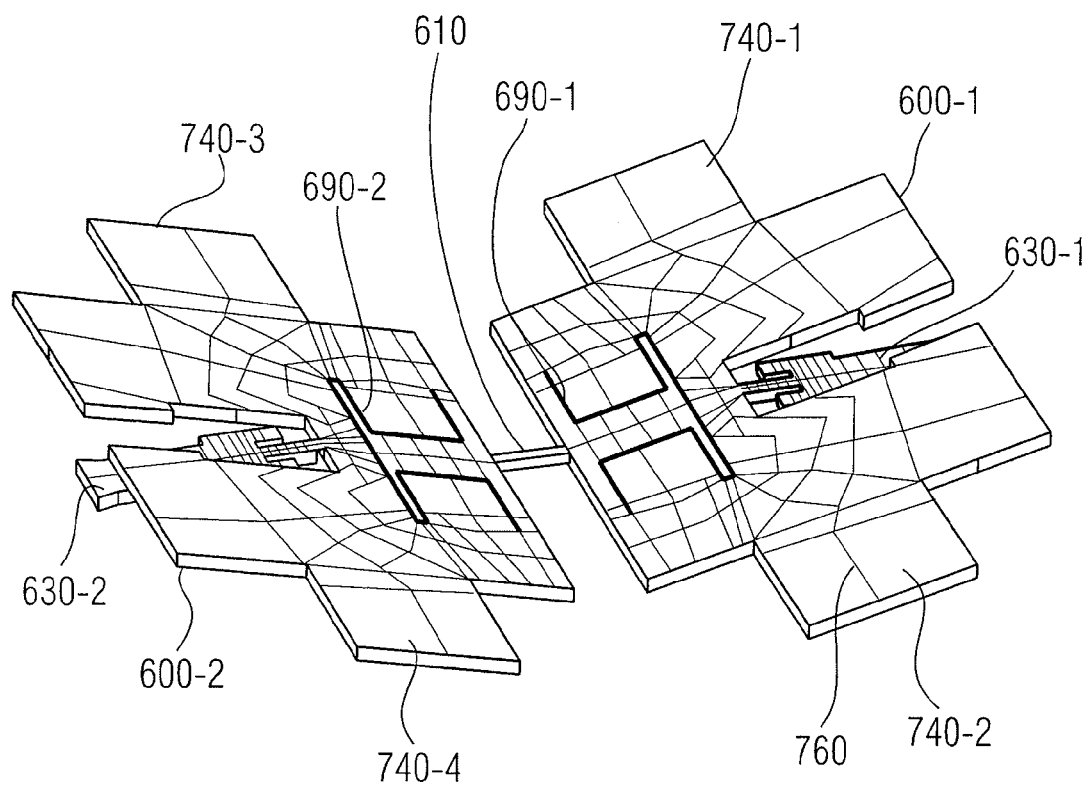
FIG. 10 shows a result of a simulation of the excitation mode (fourth mode) of a mechanical resonator shown in FIG. 6-8.

FIG. 10 shows the excitation mode (fourth mode) which can be initiated by the excitation electrodes underneath the mechanical resonator 110. While FIG. 9 illustrated that in the intermediate mode the two oscillation plates 600-1, 600-2 oscillate mainly out-of-phase in the plane of the mechanical resonator, FIG. 10 illustrates that the excitation mode or fourth mode, comprises a vertical bending of the beams 630-1, 630-2 and 610, about a horizontal axis. Typically, the resonance frequency of this mode is significantly higher or significantly lower, as compared to the resonance frequency of the intermediate mode shown in FIG. 9, and the detection mode for the angular rate as will be discussed in the framework of FIG. 11. Typically, the resonance frequency of the excitation mode (fourth mode) is of the order of 20 kHz to 200 kHz. The simulation shown in FIG. 10 is based on a resonance frequency of 30 kHz.

By applying, for instance, a constant DC bias voltage via the common driver circuit 510 to the silicon structure of the mechanical resonator 110, the resonance frequency of this mode can be adjusted and thus, the electrodes can in this case, influence the mode by influencing the elastic properties of the membrane with respect to the norm of the mechanical resonator. In other words, compared to the intermediate mode shown in FIG. 9, the excitation mode shown in FIG. 10 can be tuned by applying a constant DC-biased voltage.

However, the frequency of the excitation signal applied to the excitation capacitors corresponds to the resonance frequency of the intermediate mode (second mode) shown in FIG. 9. As the resonance frequency of the excitation mode shown in FIG. 10 (fourth mode) differs substantially from the resonance mode of the intermediate mode, almost no energy is accumulated in the excitation mode. In contrast, due to the asymmetric beam 610 in the middle or between the two butterfly masses 600-1, 600-2, the energy transferred by the excitation capacitors into the excitation mode is transferred into the intermediate mode (second mode), as a resonance oscillation in the excitation mode is not wanted.

The excitation electrodes are arranged underneath the center of the mechanical resonator, the fourth mode or excitation mode will be excited at the resonance frequency of the intermediate mode. The dynamics of the intermediate mode is then created due to the asymmetry of the asymmetric beam 610, so that at least part of the motion of the excitation mode is transferred to the intermediate mode. Accordingly, the energy of the excitation mode is then stored in the intermediate mode.

Figure 11:
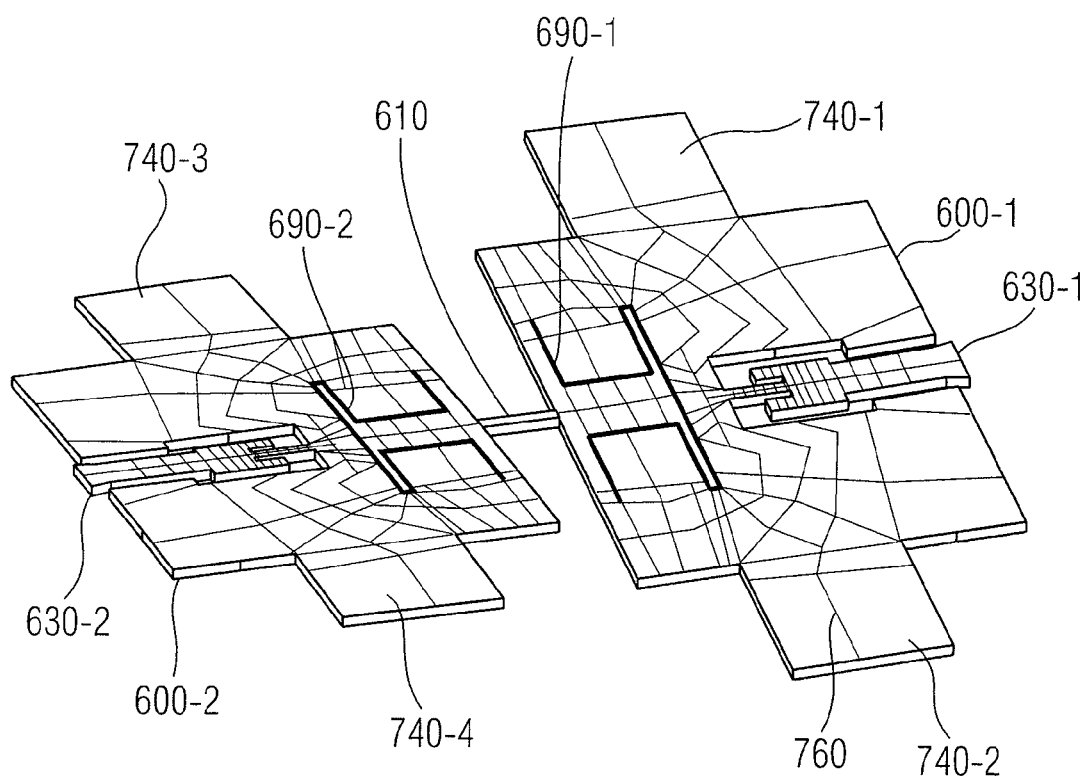
FIG. 11 shows a result of a simulation of a detection mode (third mode) of a mechanical resonator shown in FIG. 6-8.

FIG. 11 shows a result of a MEMS simulation of a mechanical resonator SAR10, which is employed for detecting an angular rate. The detection mode (differential mode or out-of-phase mode) represents a torsion of the beams 630-1, 630-2 and 610, which makes the masses 601-1, 601-2 oscillate out of face about a horizontal axis. As a consequence, the wings 740-1 and 740-4 move simultaneously upwards, while the wings 740-2 and 740-3 move at the same time downwards with respect to the axis defined by the three beams, 630-1, 630-2 and 610. This detection mode, which is also referred to as the third mode, usually has a resonance frequency of the order of 10 kHz. Similar to the intermediate mode shown in FIG. 9, the resonance frequency is in the range between 1 kHz and 20 kHz, to be more precise. The result of a simulation shown in FIG. 11 is based on a frequency of 9 kHz. As a consequence, the resonance frequencies of both the intermediate mode and the detection mode for the angular rate are significantly different from the resonance frequency of the excitation mode (fourth mode) used to generate the intermediate mode. As a consequence, the excitation mode does not significantly interfere with the detection mode for the angular rate measurement.

The frequency range of a detection mode usually varies due to manufacturing tolerances in the range of approximately +/−10% of the average or ideal resonance frequency of this mode. By applying, for instance, a constant DC-biased voltage via the common driver circuit 510, the detection mode for the angular velocity can be tuned or altered. Hence, the detection mode, as well as the excitation mode, are alterable modes in the sense that their resonance frequency can be adjusted by applying the voltage signal or another signal in the case of a different mechanical resonator 110 via the common driver circuit 510.

In the case of the mechanical resonator 110 shown in FIGS. 6 to 11, the frequency of the detection mode can be tuned by altering the "electrostatic springs" by adjusting the common mode portion of the electrode voltages or by applying a common electrode voltage via the common driver circuit 510. Hence, it is possible to adjust the detection mode for the angular rate with respect to the intermediate mode, which is, as explained, not changeable by applying a common electrode voltage.

To compensate the fabrication-related variations with respect to the eigenfrequency of the detection mode, can be compensated by applying a voltage well below 5V. To be more precise, to alter the second frequency of the detection mode for the angular rate, the range of +/−10% m, applying a voltage in the region of 1-2 Vv is typically sufficient. By applying a voltage to the silicon structure of the mechanical resonator 110 in the range between 10-20 V, the effect, with respect to shifting the eigenfrequency would accordingly be larger.

The previous discussion has shown, that by the right symmetric mechanical design and by connecting the electrodes cross-wise symmetric, the butterfly masses 740-1 to 740-4 are operated in an anti-phase movement using pairs of differential capacitors. The balanced anti-phase vibration of both the intermediate mode (second mode) and the detection mode for the angular rate (third mode) make the special design of the mechanical resonator 110 insensitive to environmental vibrations, limited effects causing offset as well as improving the Q-factors.

A mechanical resonator, like the one shown in FIGS. 6 to 11, can be designed such that it comprises at least a further detection mode, which is sensitive to a linear acceleration. In this detection mode, the four wings 740 move simultaneously upwards or downwards. However, compared to the excitation mode shown in FIG. 10, in which the four wings 740 more or less oscillate around an axis in the plane of the butterfly masses 600-1, 600-2 and perpendicular to the connecting line between the springs 630-1, 630-2 and the asymmetric beam 610 through the center of the wings 740-3 and 740-4 or 740-1 and 740-2, the displacement of the four wings 740 is not dominated by an oscillation in the detection mode for the linear acceleration, but by an upwards and downwards movement of the whole wings 740. Moreover, the detection mode for the linear acceleration comprises a resonance frequency, which is in the range of 30 kHz to 80 kHz. A typical value for the eigenfrequency of this detection mode is in the range between 40 kHz and 60 kHz. In other words, the eigenfrequency is of the order of 50 kHz. As a consequence, the resonance frequency of this detection mode is significantly larger compared to the frequency of the excitation mode shown in FIG. 10, i.e. 30 kHz.

The reasons for this significant difference with respect to the eigenfrequency is the fact that the elastic constants for this motion is dominated by the design of the wings 740, which is, compared to the stiffness of the spring 630 and the asymmetric beam 610, significantly larger. In other words, as in this detection mode the wings 740 which are much more stiff than the comparably thin spring 630 and the beam 610, will be bent, the elastic constant for an oscillation of the wings is significantly higher leading to higher resonance frequencies.

Furthermore, this mode can also be tuned by applying, for instance, a constant DC-bias voltage to the silicon structure of the mechanical resonator 110. In this case, a higher electrical voltage also results in a higher elastic constant of the "electrostatic springs" so that the frequency of the detection mode will also become larger with increasing voltages. However, the influence is, compared to the influence of a detection mode for the angular rate, smaller as the same electrostatic force will create a smaller relative change of the elastic constant of the more stiffer structure formed by the wings 740.

MEMS simulations have shown a significant sensitivity with respect to the detection mode for linear accelerations with respect to vertical linear accelerations perpendicular to the plane of the mechanical resonator 110 (z-direction of coordinate system 640 in FIG. 5). Due to this sensitivity, this detection mode for the linear acceleration can be considered a parasitic mode of the IFS SensorNor for measurements of the angular rate. However, this detection mode can be extraordinarily well employed for detecting linear accelerations with respect to the normal of the plane of the mechanical resonator 110.

Moreover, due to the arrangement of the electrodes shown in FIG. 6 and the illustrated detection mode for an angular rate shown in FIG. 11, the detection mode employed to measure the angular rate creates primarily a differential change of the capacity values of the detection capacitors, as the counter electrodes or measurement electrodes are positioned underneath the wings 740. The detection mode for the linear acceleration, which can be excited by linear acceleration perpendicular to the plane of the mechanical resonator 110 will create a common mode change of the capacity values of the detection capacitors with respect to the same electrodes. As a consequence, the two signals can be separated by calculating the sum and the difference of the respective elongation signals, as previously explained.

Although in the embodiment described in the context of FIGS. 4 and 6-11, the detection mode for the angular rate (leading to the differential mode signal) and the detection mode for the linear acceleration (leading to the common mode signal) comprise of significant difference of eigenfrequencies or resonance frequencies, this is not a requirement. In principle, the frequencies of the respective detection mode can be chosen to be identical, or at least close, as the calculation of the common mode signal and the differential mode signal provides a possibility to separate the signals indicative of the two detection modes independent of the frequencies involved. However, using different resonance frequencies for the two detection modes might an advisable option as additionally, band-pass filters or other filters can be employed to separate the signals further.

FIG. 12 shows a possible implementation of an embodiment of a sensor 100 in the form of a SOIC MEMS package (SOIC=Small Outline Integrated Circuit). To be more accurate, FIG. 12 shows and interior view of a transfer molded SOIC package. The implementation comprises a MEMS chip 800 comprising the mechanical resonator 110 (not shown in FIG. 12) and a signal processing ASIC 810, which are packed together in the SOIC package (ASIC=Application specific Integrated Circuit). The MEMS chip 800 and the ASIC 810 are connected via bond wires 820. Moreover, bond wires 830 are used to contact the ASIC 810 to bond pads 840 of the SOIC package.

The MEMS chip 800 comprises the double mass butterfly shaped structure which employs, as previously explained, the simple single sided electrostatic excitation capacitive detection. The micromachine mechanical resonator or gyro element 110 (not shown in FIG. 12) is assembled together with an advanced mixed mode full custom ASIC chip 810 into the epoxy transfer molded 16 pin SOIC miniature package. The ASIC chip 810 can for instance be fabricated in the 0.5 µm BiCMOS technology. However, technologies with higher resolutions or different technical features can also be employed. Furthermore, it should be noted that in principle, both the MEMS chip 800 and the ASIC chip 810 can be integrated onto a single chip. In other words, mechanical resonator 110 as well as the necessary evaluation circuits can be integrated into a single die.

The SOIC shown in FIG. 12 can for instance be used as a combined linear acceleration and angular rate monitor or gyro for a rollover detection, crash detection or other stability control applications in the field of automotive electronics.

Depending on certain implementation requirements of the embodiments of the methods, embodiments of the methods can be implemented in hardware or in software. The implementation can be performed using a digital storage medium, in particular a disc, CD or a DVD having an electronically readable control signal stored thereon which cooperates with a programmable processor such that an embodiment of the method is performed. Generally, an embodiment is, therefore, a computer program product with a program code stored on a machine-readable carrier, the program code being operative for performing an embodiment of the methods when the computer program product runs on a processor. In other words, embodiments of the methods are therefore, a computer program having a program code for performing at least one embodiment of the methods, when the computer program runs on a processor. The processor can be formed by a computer, a smart card, an ASIC or another integrated circuit.

While the foregoing has been particularly shown and described with reference to particular embodiments thereof, it will be understood by those skilled in the art that various other changes in the form and detail may be made without departing from the spirit and scope thereof. It is to be understood that various changes may be made in adapting the different embodiments without departing from the broader concept disclosed herein and comprehended by the claims that follow.

LIST OF REFERENCE SIGNS 100 sensor
110 mechanical resonator
120 first area
130 second area
140 arrow
150 axis
160 arrow
170 first mechanical-electrical interface
180 second mechanical-electrical interface
190 common mode signal generator
200 differential mode signal generator
210 first processing circuit
220 second processing circuit
230 output
240 output
250 sensor block
260 measurement block
270 signal processing block
300 housing
300-1,-4 capacitors
320 exciter
330 multiplexer
340 driver circuit
350 sample & hold-stage
360 analog/digital converter
370 filter element
380 excitation controller
390 digital/analog converter
400 multiplexer
410 sampler & hold-stage
420 driver circuit
430 analog/digital converter
440 filter element
450 filter element
460 detection controller
470 signal processing stage
480 digital/analog converter
490 acceleration controller
500 signal processing stage
510 common driver circuit
520 opposing arrows
530 parallel arrows
600-1,-2 oscillating plate
610 asymmetric beam
620 mounting
630-1-2 springs
640 coordinate system
650-1,-4 detection electrodes
660-1,-4 excitation electrode
670-1,-2 arrows
675 axes
680 arrow
690-1,-2 spring elements
700 shadow
710-1,-2 axes
720 axis
730 hole
740-1-4 wings
750 recess etch
760 contour lines
800 MEMS chip
810 ASIC chip
820 bond wires
830 bond wires
740 bond pads

What is claimed is:

1. A sensor comprising:
a suspended mechanical resonator comprising a first oscillating plate and a second oscillating plate which are suspended via spring beams and interconnected by a connecting beam being collinear to the spring beams on a common axis such that the suspended mechanical resonator extends, in an equilibrium state, in a resonator plane and is configured to oscillate in an intermediate mode, a first detection mode and a second detection mode;
an exciter with an exciter mechanical-electrical interface configured to excite the intermediate mode, wherein the suspended mechanical resonator is designed such that, in the intermediate mode, the first and second plate perform opposite rotating in-plane oscillation movements within the resonator plane, wherein the suspended mechanical resonator is further adapted such that a linear acceleration of the sensor along a first direction perpendicular to the resonator plane, with the suspended mechanical resonator having the intermediate mode excited, results in the suspended mechanical resonator exhibiting the first detection mode in which lateral portions of the first and second oscillating plates, being laterally displaced from the common axis, are bent in an oscillating manner synchronously upwards and downwards relative to the resonator plane, and an angular velocity of the sensor in a second direction parallel to the resonator plane, with the suspended mechanical resonator having the intermediate mode excited, results in the suspended mechanical resonator exhibiting the second detection mode in which the lateral portions of the first and second oscillating plates are subject to counter-oscillating movements upwards and downwards relative to the resonator plane;

a first detection electrode arranged offset to the resonator plane, facing a first one of the lateral portions of the first and second oscillating plates and comprising a terminal, at which a first signal indicative of the displacement of the first lateral portion from the resonator plane is provided;

a second detection electrode arranged offset to the resonator plane, facing a second one of the lateral portion of the first and second oscillating plates and comprising a terminal, at which a second signal indicative of the displacement of the second lateral portion from the resonator plane is provided;

a common mode signal generator coupled to the first detection electrode and the second detection electrode, the common mode signal generator comprising a common mode signal output configured to provide a common mode signal based upon the first and the second signals;

a differential mode signal generator coupled to the first detection electrode and the second detection electrode the differential mode signal generator comprising a differential mode signal output configured to provide a differential mode signal based upon the first and the second signals;

a first processing circuit coupled to the differential mode output, with an output for a first processed signal based upon the differential mode signal, indicative of the angular velocity of the sensor; and a second processing circuit coupled to the common mode output with an output for a second processed signal based upon the common mode signal, indicative of the linear acceleration of the sensor.

2. The sensor according to claim 1, further comprising a first analog/digital converter coupled in between the terminal of the first mechanical-electrical interface, the terminal of the second mechanical-electrical interface and the common mode signal generator and the differential mode signal generator, such that the common mode signal generator and the differential mode signal generator are configured to digitally process the first and second signals.

3. The sensor according to claim 1, wherein the exciter mechanical-electrical interface is configured to influence a first excitation area and a second excitation area of the suspended mechanical resonator.

4. The sensor according to claim 1, further comprising a differential mode feedback controller coupled to a differential mode feedback signal output with an output for a differential feedback signal, a common mode feedback controller coupled to the common mode signal output with an output for a common mode feedback signal and a signal generator coupled to the common mode feedback controller and the differential mode feedback controller with an output for a first feedback signal and an output for a second feedback signal, wherein the first and the second feedback signals are based on the common mode feedback signal and the differential mode feedback signal, and wherein the output for the first feedback signal is coupled to the first detection electrode and the output for the second feedback signal is coupled to the second detection electrode such that the counter-oscillating movement and the movement in the oscillating manner of the first and second lateral portions are compensable.

5. The sensor according to claim 4, further comprising a multiplexer configured to provide the first signal and the second signal to the common mode signal generator and the differential mode signal generator without influence by the first feedback signal and the second feedback signal.

6. The sensor according to claim 4, wherein the sensor further comprises an analog/digital converter coupled in between the terminals of the first and the second detection electrodes and the differential mode feedback controller and the common mode feedback controller, and wherein the differential mode feedback controller and the common mode feedback controller are configured to perform digital signal processing.

7. The sensor according to claim 1, wherein the suspended mechanical resonator is a MEMS mechanical resonator.

8. The sensor according to claim 1, wherein the exciter is configured to excite the suspended mechanical resonator in a closed feedback loop.

9. The sensor according to claim 8, wherein the exciter comprises an analog/digital converter and a digital/analog converter such that the closed feedback loop is based on a digital signal processing.

10. The sensor according to claim 1, wherein the connecting beam interconnecting the first oscillating plate and the second oscillating plate is an asymmetric beam, and the exciter mechanical-electrical interface comprises first and second excitation electrodes facing a first excitation area of the first oscillating plate and a second excitation area of the second oscillating plate, respectively, and the exciter is configured to excite the intermediate mode indirectly by causing alternating electrostatic attraction between the first excitation area and first excitation electrode in the direction perpendicular to the resonator plane and between the second excitation area and second excitation electrode in the direction perpendicular to the resonator plane.

11. The sensor according to claim 1, wherein a resonance frequency of the first detection mode is different from a resonance frequency of the second detection mode.

12. The sensor according to claim 1, wherein the connecting beam interconnecting the first oscillating plate and the second oscillating plate is an asymmetric beam, and the suspended mechanical resonator is configured to oscillate in an excitation mode, the intermediate mode, the first detection mode and the second detection mode, wherein the exciter is configured to indirectly excite the intermediate mode by exciting the excitation mode of the suspended mechanical resonator at a frequency approximately matching a resonance frequency of the intermediate mode and being different from a resonance frequency of the excitation mode such that an excitation energy provided by the exciter is distributed, by the asymmetric beam, in the intermediate mode more than in the excitation mode.

13. The sensor according to claim 1, wherein the suspended mechanical resonator is further adapted such that, in the first detection mode, the lateral portions of the first and second oscillating plates are bent in the oscillating manner synchronously upwards and downwards relative to the resonator plane at a resonance frequency substantially determined by a stiffness of the first and second oscillating plates, and that in the second detection mode, the lateral portions of the first and second oscillating plates are subjected to counter-oscillating movements upwards and downwards relative to the resonator plane at a resonance frequency determined by a stiffness of a suspension of the first and second oscillating plates and being lower than a resonance frequency of the first detection mode.

14. A method for sensing a linear acceleration and an angular velocity using a suspended mechanical resonator comprising a first oscillating plate and a second oscillating plate which are suspended via spring beams and interconnected by a connecting beam being collinear to the spring beams on a common axis such that the suspended mechanical resonator extends, in an equilibrium state, in a resonator plane and is configured to oscillate in an intermediate mode, a first detection mode and a second detection mode, comprising:

exciting the intermediate mode such that, in the intermediate mode, the first and second plate perform opposite rotating in-plane oscillation movements within the resonator plane, and such that a linear acceleration of the sensor along a first direction perpendicular to the resonator plane, with the suspended mechanical resonator having the intermediate mode excited, results in the suspended mechanical resonator exhibiting the first detection mode in which lateral portions of the first and second oscillating plates, being laterally displaced from the common axis, are bent in an oscillating manner synchronously upwards and downwards relative to the resonator plane, and an angular velocity of the sensor in a second direction parallel to the resonator plane, with the suspended mechanical resonator having the intermediate mode excited, results in the suspended mechanical resonator exhibiting the second detection mode in which the lateral portions of the first and second oscillating plates are subject to counter-oscillating movements upwards and downwards relative to the resonator plane;

detecting a displacement of a first one of the lateral portions of the suspended mechanical resonator from the resonator plane;

detecting a displacement of a second one of the lateral portions of the suspended mechanical resonator from the resonator plane;

generating a common mode signal based upon the displacement of the first lateral portion and the displacement of the second lateral portion;

generating a differential mode signal based upon the displacement of the first lateral portion and the displacement of the second lateral portion;

processing the differential mode signal to a first processed signal indicative of the angular velocity of a sensor; and processing the common mode signal to a second processed signal indicative of the linear acceleration of the sensor.

15. The method of claim 14, wherein the suspended mechanical resonator is further adapted such that, in the first detection mode, the lateral portions of the first and second oscillating plates are bent in the oscillating manner synchronously upwards and downwards relative to the resonator plane at a resonance frequency substantially determined by a stiffness of the first and second oscillating plates, and that in the second detection mode, the lateral portions of the first and second oscillating plates are subjected to counter-oscillating movements upwards and downwards relative to the resonator plane at a resonance frequency determined by a stiffness of a suspension of the first and second oscillating plates and being lower than a resonance frequency of the first detection mode.

16. The method of claim 14, wherein the connecting beam interconnecting the first oscillating plate and the second oscillating plate is an asymmetric beam, and the excitation is performed via first and second excitation electrodes facing a first excitation area of the first oscillating plate and a second excitation area of the second oscillating plate, respectively, by exciting the intermediate mode indirectly by causing alternating electrostatic attraction between the first excitation area and first excitation electrode in the direction perpendicular to the resonator plane and between the second excitation area and second excitation electrode in the direction perpendicular to the resonator plane.

17. Computer executable instructions stored on a computer readable medium with a computer program product comprising code, said code, when running on a computer, performing a method for sensing a linear acceleration and an angular velocity using a suspended mechanical resonator comprising a first oscillating plate and a second oscillating plate which are suspended via spring beams and interconnected by a connecting. beam being collinear to the spring beams on a common axis such that the suspended mechanical resonator extends, in an equilibrium state, in a resonator plane and is configured to oscillate in an intermediate mode, a first detection mode and a second detection mode, comprising:

exciting the intermediate mode such that, in the intermediate mode, the first and second plate perform opposite rotating in-plane oscillation movements within the resonator plane, and such that a linear acceleration of the sensor along a first direction perpendicular to the resonator plane, with the suspended mechanical resonator having the intermediate mode excited, results in the suspended mechanical resonator exhibiting the first detection mode in which lateral portions of the first and second oscillating plates, being laterally displaced from the common axis, are bent in an oscillating manner synchronously upwards and downwards relative to the resonator plane, and an angular velocity of the sensor in a second direction parallel to the resonator plane, with the suspended mechanical resonator having the intermediate mode excited, results in the suspended mechanical resonator exhibiting the second detection mode in which the lateral portions of the first and second oscillating plates are subject to counter-oscillating movements upwards and downwards relative to the resonator plane;

causing a first detection electrode to detect a displacement of a first one of lateral portions of a suspended mechanical resonator from a resonator plane;

causing a second detection electrode to detect a displacement of a second one of lateral portions of the suspended mechanical resonator from the resonator plane;

generating a common mode signal based upon the displacement of the first lateral portion and the displacement of the second lateral portion;

generating a differential mode signal based upon the displacement of the first lateral portion and the displacement of the second lateral portion;

processing the differential mode signal to a first processed signal indicative of the angular velocity of a sensor; and processing the common mode signal to a second processed signal indicative of the linear acceleration of the sensor.

18. The computer-readable medium of claim 17, wherein the suspended mechanical resonator is further adapted such that, in the first detection mode, the lateral portions of the first and second oscillating plates are bent in the oscillating manner synchronously upwards and downwards relative to the resonator plane at a resonance frequency substantially determined by a stiffness of the first and second oscillating plates, and that in the second detection mode, the lateral portions of the first and second oscillating plates are subjected to counter-oscillating movements upwards and downwards relative to the resonator plane at a resonance frequency determined by a stiffness of a suspension of the first and second oscillating plates and being lower than a resonance frequency of the first detection mode.

19. The computer-readable medium of claim 17, wherein the connecting beam interconnecting the first oscillating plate and the second oscillating plate is an asymmetric beam, and the excitation is performed via first and second excitation electrodes facing a first excitation area of the first oscillating plate and a second excitation area of the second oscillating plate, respectively, by exciting the intermediate mode indirectly by causing alternating electrostatic attraction between the first excitation area and first excitation electrode in the direction perpendicular to the resonator plane and between the second excitation area and second excitation electrode in the direction perpendicular to the resonator plane.

* * * * *